(12) United States Patent
Ito et al.

(10) Patent No.: US 6,434,709 B1
(45) Date of Patent: Aug. 13, 2002

(54) REMOTE DIAGNOSTIC SYSTEM FOR DIAGNOSING DEVICES CONNECTED TO A PLURALITY OF TERMINALS

(75) Inventors: Masazumi Ito, Toyohashi; Ikunori Yamaguchi, Toyokawa; Atsushi Tomita; Naohiro Yonezu, both of Toyohashi, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/311,586

(22) Filed: May 14, 1999

(30) Foreign Application Priority Data

May 15, 1998 (JP) ............................................. 10-133585

(51) Int. Cl.[7] ................................................. G06F 1/04
(52) U.S. Cl. ...................................................... 713/502
(58) Field of Search .......................... 713/502; 714/25, 714/30, 40, 44

(56) References Cited

U.S. PATENT DOCUMENTS

| | | | |
|---|---|---|---|
| RE33,368 E | * 10/1990 | Darling et al. ............... | 375/222 |
| 5,434,650 A | 7/1995 | Nakahara et al. | |
| 5,455,933 A | * 10/1995 | Schieve et al. ................ | 714/27 |
| 5,528,748 A | * 6/1996 | Wallace ........................ | 714/25 |

* cited by examiner

Primary Examiner—Thomas M. Heckler
(74) Attorney, Agent, or Firm—Burns, Doane, Swecker & Mathis, LLP

(57) ABSTRACT

A remote diagnostic system is structured as follows for selectively controlling a communication method considering the difference in environment of terminals connected to a computer. The remote diagnostic system is constituted of a computer having means for enabling transmission and reception of data, and a plurality of terminals each having means for enabling transmission and reception of data. In the remote diagnostic system, the computer diagnoses respective devices controlled on the basis of respective terminals by making periodical communication with the plurality of terminals. The plurality of terminals include a first group of at least one terminal receiving from the computer a signal for starting transmission and reception of data and a second group of at least one terminal transmitting to the computer the signal for starting transmission and reception of data.

18 Claims, 17 Drawing Sheets

SHEET DISCHARGE CODE : FALLING OF b0
JAM OCCURRENCE CODE : b7=1, b6=0
TROUBLE OCCURRENCE CODE : b7=1, b6=1

LOWER PRIORITY TRANSMISSION

↔ ANOTHER MACHINE

HIGHER PRIORITY TRANSMISSION

↔ ONCE
↔ TWICE

REMOTE DIAGNOSTIC SYSTEM FOR DIAGNOSING DEVICES CONNECTED TO A PLURALITY OF TERMINALS

This application is based on application No. 10-133585 filed in Japan, the contents of which is hereby incorporated by reference.

BACKGROUND OF THE INVENTION

1. Field of the Invention

The present invention relates to a remote diagnostic system constituted of a computer having means for enabling communication of data, and a plurality of terminals having means for enabling communication of data, for making a remote diagnosis for each device by periodically communicating the state of the device using the computer.

2. Description of the Related Art

A conventionally known remote diagnostic system periodically makes communication between a terminal connected to a device and a remote diagnostic unit to make a remote diagnosis for the device periodically. In general, the public telephone line is utilized for communication between the terminal and the remote diagnostic unit. The following two methods have been devised for connecting the terminal with the public telephone line.

(1) Allocating a dedicated line to the terminal:

An advantage of this method is in that the starting time of communication and the communication period are not limited since the terminal is connected with the dedicated line, while a disadvantage thereof is the cost of the work required for installing the dedicated line.

(2) Allocating an existing line to the terminal:

The terminal is connected as a branch machine to a base machine connected to the existing line. According to this method, the necessary work is just interconnection between the base machine and the terminal. Therefore, this method is advantageously inexpensive since the work for installing the dedicated line is unnecessary. However, a problem arises when the remote diagnostic unit attempts to apply a trigger to the terminal for starting communication. If the base machine is a telephone set, for example, the trigger causes the telephone set to ring (corresponding to call) and the user may take up its handset. As a result, communication between the remote diagnostic unit and the terminal cannot be started. Accordingly, a disadvantage of this method is in that only the terminal (branch machine) can apply the trigger for starting communication.

Two methods listed below have been devised for applying a trigger to start communication between the remote diagnostic unit and the terminal.

(1) Applying a trigger by the remote diagnostic unit:

If there are a plurality of terminals that should communicate with the remote diagnostic unit, this method allows the remote diagnostic unit to make a schedule. For example, if any device connected to one of the terminals fails, an emergency communication from the terminal interrupts in the remote diagnostic unit. An advantage of this method in this case is in that the schedule can easily be arranged again. However, if the terminal is connected to the base machine as a branch machine, the call for communication is inconveniently supplied not only to the branch machine but to the base machine. Further, if the terminal is busy, communication is impossible and the second call have to be made. The busy state of the terminal refers to the state in which the terminal is a copying machine and the copying machine is in use for making copies, for example.

(2) Applying a trigger by the terminal:

An advantage of this method is in that communication is possible without affecting a base machine when the terminal is connected as a branch machine to the base machine. A further advantage is in that when the terminal is busy at a communication time which is preliminary allocated to the terminal, or when the base machine uses the line at that time, communication can be started after the terminal temporarily ends the busy state or after detection of termination of the communication by the base machine. However, in order to make communication with the remote diagnostic unit, the starting time of the communication should be allocated to each terminal and the time should be input for storing the allocated time in each terminal, requiring the user operating the terminal to perform a troublesome work. In addition, the terminal cannot make communication with the remote diagnostic unit when an emergency communication from another terminal interrupts in the remote diagnostic unit, and the need of redialing occurs.

The conventional system employs the public telephone line, so that the user needs to interconnect a telephone switching unit with the terminal, leading to an additional cost. Depending on the length of the interconnection, the range in which the terminal can be located is fixed to considerably limit the location of the terminal when the arrangement of office furniture is to be changed. In some cases, the interconnection must be made again for moving the terminal.

SUMMARY OF THE INVENTION

The present invention has been made for solving the problems above. One object of the present invention is to provide a remote diagnostic system capable of selecting a method of communication considering the difference in environment of terminals connected to a computer.

Another object of the invention is to provide a remote diagnostic system capable of preventing an inconvenience of occurrence of a call to a base machine when a terminal is a branch machine of the base machine, and accordingly reducing the rate of occurrence of redialing to achieve timely communication of information.

Further object of the invention is to provide a remote diagnostic system which does not require interconnection between a telephone switching unit and a terminal and thus provides a wide freedom of location of the terminal.

In order to achieve the above objects, according to one aspect of the invention, a remote diagnostic system includes a computer having means for enabling transmission and reception of data, and a plurality of terminals each having means for enabling transmission and reception of data. In the remote diagnostic system, the computer diagnoses respective devices connected to respective terminals by transmitting and receiving data to and from the plurality of the terminals at a prescribed time interval.

The plurality of terminals include a first group of at least one terminal which receives from the computer a start signal for starting transmission and reception of data, and a second group of at least one terminal which transmits to the computer the start signal for starting transmission and reception of data.

According to another aspect of the invention, a terminal is connected to a device and transmits a state of the device to a computer by transmitting and receiving data to and from the computer. The terminal includes communication means for transmitting and receiving data to and from the computer, clock means for measuring time, and means for setting a prescribed time. The communication means transmits a start signal to the computer for starting transmission and reception of data when the measurement of the clock means indicates the set prescribed time. The prescribed time is included in the data transmitted from the computer.

According to a further aspect of the invention, a computer diagnoses devices connected respectively to a plurality of terminals by transmitting and receiving data to and from the plurality of terminals. The computer includes communication means for transmitting and receiving data to and from the terminals, clock means for measuring time, means for setting a first time and a second time, first communication starting means for transmitting to the terminals a start signal for enabling the communication means when the measurement of the clock means indicates the first time, second communication starting means for enabling the communication means when the second communication means receives from the terminals a start signal for starting transmission and reception of data, and time transmitting means for transmitting the second time to the terminals when the communication means is enabled by the second communication starting means.

The invention above is thus effective in that it is possible to select a communication method considering difference in environment of the terminals connected to the computer. The invention is further effective in that it is possible to prevent an inconvenience of occurrence of a call to a base machine when a terminal is a branch machine of the base machine and accordingly reduce the rate of occurrence of redialing, and consequently, the information can timely be transmitted and received. In addition, the invention is effective in that interconnection between a telephone switching unit and a terminal is unnecessary owing to use of radio, and thus a wide freedom of location of the terminal is achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A copying machine control system according to one embodiment of the invention is hereinafter described with reference to the drawings.

Figure 1:
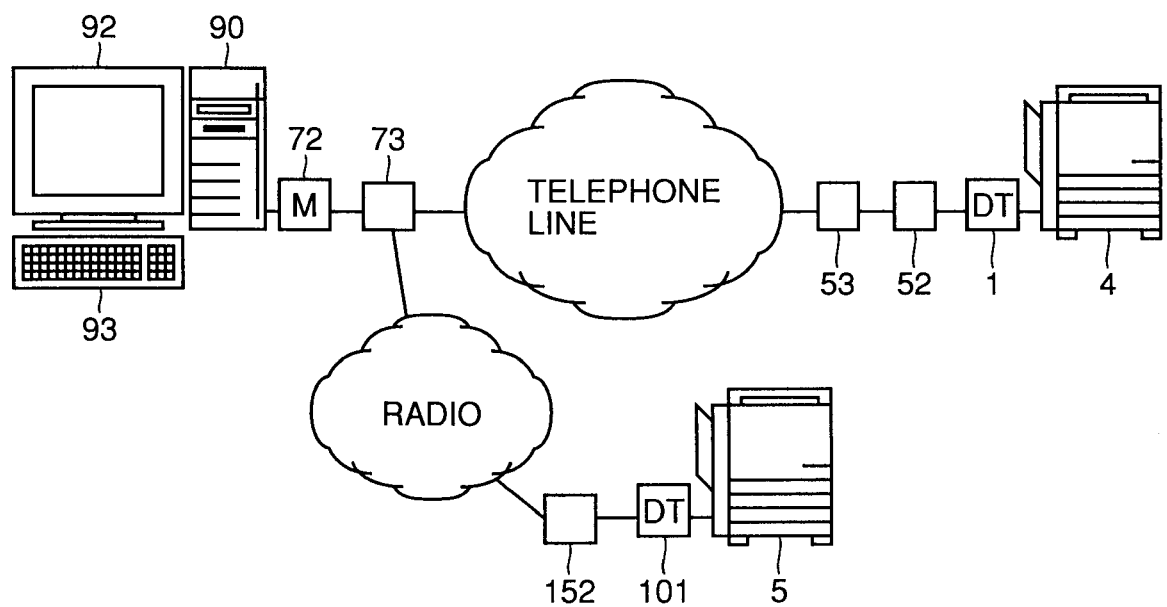
FIG. 1 illustrates a structure of a remote diagnostic system according to one embodiment of the present invention.
Figure 2:
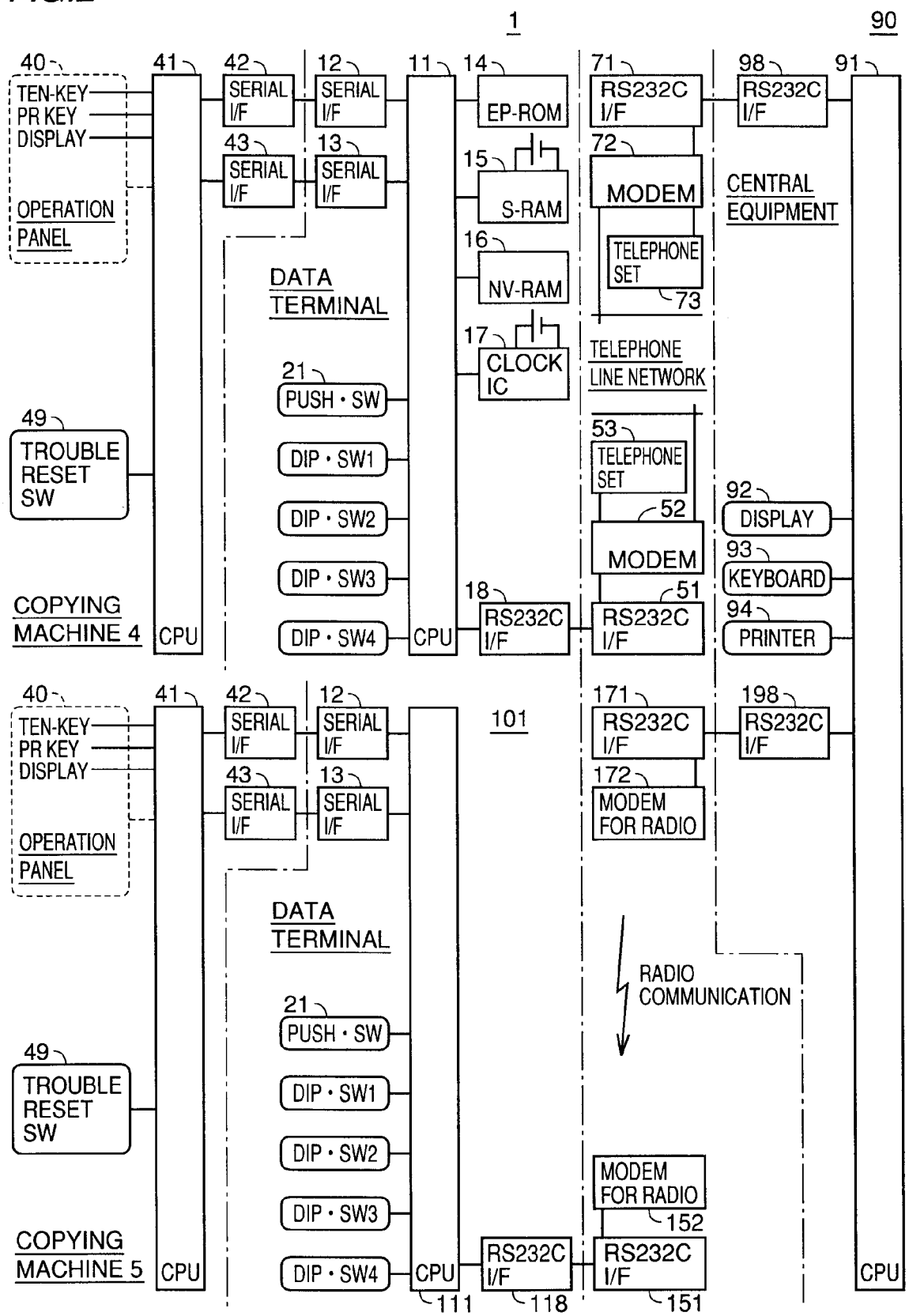
FIG. 2 is a partial block diagram showing a circuit structure of the system.

Referring to FIGS. 1 and 2, the copying machine control system is constituted of a number of user equipments (only two types of the user equipments are shown in this embodiment), a central equipment (corresponding to a remote diagnostic unit) functioning as a controller, and a telephone line network and a radio communication network that connect these equipments.

The first user equipment includes a copying machine 4, a data terminal 1, a modem 52 functioning as a communication terminal device, and a telephone set 53 functioning as an ordinarily calling device. The second user equipment includes a copying machine 5, a data terminal 101, and a modem 152 functioning as a radio terminal device.

The central equipment includes a modem 72 functioning as a communication terminal device, a modem 172 functioning as a radio terminal device, a computer 90, a display 92, a keyboard 93, a printer 94, and a telephone set 73 functioning as an ordinary calling device.

Data terminals 1 and 101 take in information on various matters of copying machines 4 and 5, applies a prescribed process to the information and transmits resultant data to computer 90 of the central equipment corresponding to the remote diagnostic unit. Computer 90 of the central equipment generates data used for controlling the copying machines based on the transmitted data, and appropriately takes a necessary procedure accordingly. Specifically, the computer conducts various diagnoses on copying machine 4 based on data transmitted from data terminal 1 via a telephone line. In particular, based on, for example, the state of the copying machine and cause of failure, data used for controlling the copying machine, specifically procedures for dealing with the failure and a certainty factor are produced. The computer also conducts various diagnoses on copying machine 5 as does on copying machine 4 based on data transmitted from data terminal 101 via radio.

Each component of the user equipment and the central equipment is next described.

Copying machine 4 reads an image of an original document and forms a copied image on a sheet of paper.

Copying machine 5 has an internal structure which is identical to that of copying machine 4, therefore, only copying machine 4 is described below. The specific internal structure of the copying machine is generally a well-known art, and a detailed description thereof is omitted here. Only the essential matters and components are herein described.

A CPU 41 of copying machine 4 measures the value of each of counters, and transmits the measurement to a CPU 11 of data terminal 1 via a serial I/F 42 and a serial I/F 12.

The counters are classified into (1) counters used for charging the cost of copy, and (2) counters used for the purpose of maintenance. The counters are respectively listed below. (1) Counters used for charging the cost of copy calculated by the central equipment includes (i) a total counter indicating the number of sheet discharging operations, and (ii) counters for respective sheet sizes adapted for indicating respective numbers of sheets of different sizes that are used. (2) Counters used for the purpose of maintenance includes (i) a jam counter indicating the number of jams occurred at each location, (ii) a trouble counter indicating the number of troubles occurred at each location, and (iii) a PM counter counting the number of times each part is used, and the count value is used as the basis for a periodic maintenance operation.

In copying machine 4, various kinds of element data affecting the process for forming an image are detected by a group of various sensors placed at various locations in the machine. The detected element data are taken and processed by CPU 41, and CPU 41 thereafter transmits the processed element data to CPU 11 of data terminal 1 via serial I/F 42 and serial I/F 12. The element data relates to, for example, the time required for transporting a sheet, a surface potential of a photoreceptor drum, a toner concentration in a developer, an amount of exposure of the photoreceptor drum, a developing bias voltage, an amount of toner sticking on the photoreceptor drum, a grid voltage of a corona charger, and the like. The various kinds of element data are expressed in an abstract manner, as element data $X_i$ (i represents the number of items of the element data) in the description of flow charts described below.

Figure 4:
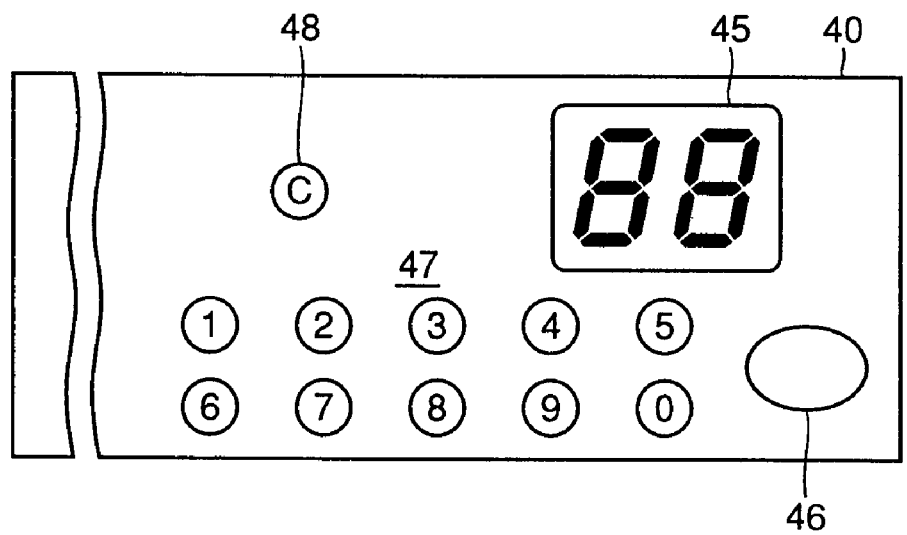
FIG. 4 illustrates an operation panel.

Copying machine 4 performs prescribed operations or mode settings in response to signals from various kinds of key switches on an operation panel (FIG. 4) (a print key 46 for commanding start of a copying operation, ten-key 47 for numerical input, a clear key 48 for commanding clearing of input data, and the like), and from various kinds of switches except for those on the operation panel (a trouble reset switch 49 for commanding reset of troubles, for example). Copying machine 4 also transmits corresponding signals as necessary to CPU 11 of data terminal 1 via serial I/F 42 and serial I/F 12. The transmitted signals include numerical data shown on a display 45.

Description on data terminals 1 and 101 is given below.

As the relation between data terminal 1 and copying machine 4 and the relation between data terminal 101 and copying machine 5 are similar to each other, only the former relation is herein described.

Data terminal 1 receives data from copying machine 4 via serial I/F 42 and serial I/F 12. Data terminal 1 connects a communication line to the central equipment by activating modems 52 and 152 when a prescribed transmission condition described below (corresponding to a condition on which a transmission flag is set to 1) is satisfied, and transmits data for controlling the copying machine (corresponding to the element data and the count data described above) to a CPU 91 of the central equipment.

To CPU 11 of data terminal 1, an ROM 14 which stores a control program, a nonvolatile memory 16 for storing data on the telephone number of the central equipment or the like, a work system RAM 15 with battery backup, and a clock IC 17 with battery backup are connected.

Figure 3:
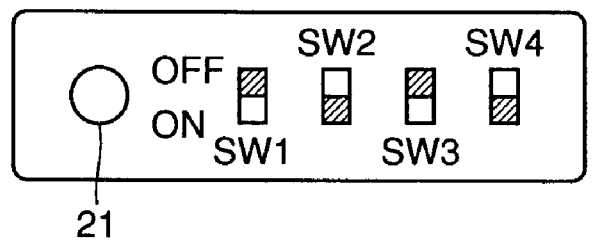
FIG. 3 illustrates an operation switch of a data terminal.

CPU 11 receives data from CPU 41 of copying machines 4 via serial I/F 42 and serial I/F 12, and performs a prescribed process. CPU 11 further performs prescribed operations/mode settings in response to signals supplied by operating various operation switches (a push switch 21, four DIP switches DIP.SW1–DIP.SW4) illustrated in FIG. 3.

DIP switch DIP.SW1 is used for setting an input mode of the telephone number of the central equipment, DIP switch DIP.SW2 is used for setting an input mode of an ID number (DTID) for identifying data terminal 1, DIP switch DIP.SW3 is used for setting an input mode of a number (central ID) for identifying the central equipment, and DIP switch DIP.SW4 is used for setting an initialization setting mode. Push switch 21 is used for commanding execution of an initialization setting transmission process (see S145 of FIG. 10).

Figure 5:
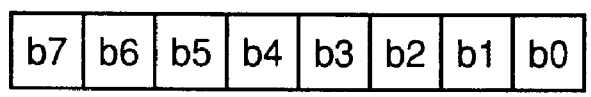
FIG. 5 illustrates codes transmitted from a copying machine to the data terminal of the remote diagnostic system.

FIG. 5 illustrates a configuration of 8-bit data b7-b0 supplied from serial I/F 12 to data terminal 1. A sheet discharge code indicating discharging of sheets is represented by a falling edge of bit b0 (transition from 1 to 0). A jam code indicating occurrence of paper jam is represented by bit b7=1 and b6=0. A trouble code indicating occurrence of various troubles is represented by bit b7=1 and bit b6=1. The 8-bit data is periodically supplied to data terminal 1. The data is promptly supplied if paper jam or trouble occurs in copying machine 4.

CPU 11 of data terminal 1 attached to copying machine 4 is connected to modem 52 functioning as a communication terminal device via a communication interface (RS232C I/F) 18 of CPU 11 and a communication interface (RS232C I/F) 51 of modem 52. Specifically, CPU 11 allows modem 52 to transmit an on-hook signal and a central equipment selection number signal to a communication line. Accordingly, modem 52 for data terminal 1 and modem 72 for the central equipment are connected by the communication line to make communication between data terminal 1 and computer 90 of the central equipment. A CPU 111 of data terminal 101 attached to copying machine 5 is connected to modem 152 functioning as a radio terminal device via a communication interface (RS232C I/F) 118 of CPU 111 and a communication interface (RS232C I/F) 151 of modem 152. Specifically, CPU 111 connects radio communication modem 152 for data terminal 101 and radio communication modem 172 of the central equipment with radio communication network to make communication between data terminal 101 and central computer 90.

Contents of data transmitted from data terminals 1 and 101 to the central equipment via the communication line or radio (data for controlling copying machines 4 and 5) are determined by the type of the transmission flag which is set to 1 as described below.

The central equipment is next described.

The central equipment corresponds to a computer unit structured such that it can be connected with a number of data terminals via a communication line network including radio communication network. The computer unit implements a centralized control over a number of copying machines connected to respective data terminals. CPU 91 has a function of controlling communication interfaces of two systems (RS232 I/F 98 and 198).

In the first system of the two systems, data (the element data, the count data and the like described above) are successively supplied from a number of data terminals 1 to CPU 91 via the communication line network, modem 72, a communication I/F (RS232 I/F) 71 for modem 72, and communication I/F (RS232 I/F) 98 for the computer. CPU 91 generates control data indicating the state of copying machine 4 connected to data terminal 1 based on the supplied data. CPU 91 transmits data to data terminal 1 when it has received data supplied from data terminal 1.

In the second system, CPU 91 makes transmission requests successively to CPU 111 via RS232 I/F 198, a communication I/F (RS232 I/F) 171 for modem 172, and modem 172 for radio communication line. In response to the transmission requests, CPU 111 transmits data (the element data, the count data and the like) to CPU 91 via modem 152 for radio communication. CPU 91 produces control data indicating the state of copying machine 5 connected to data terminal 101 based on the transmitted data. CPU 91 also allows a bill to be printed based on the control data. CPU 91 further determines whether or not a service person should be dispatched, and selects any parts that should be prepared and carried by the service person. Details of these control operations are described below using the flow charts.

Figure 6:
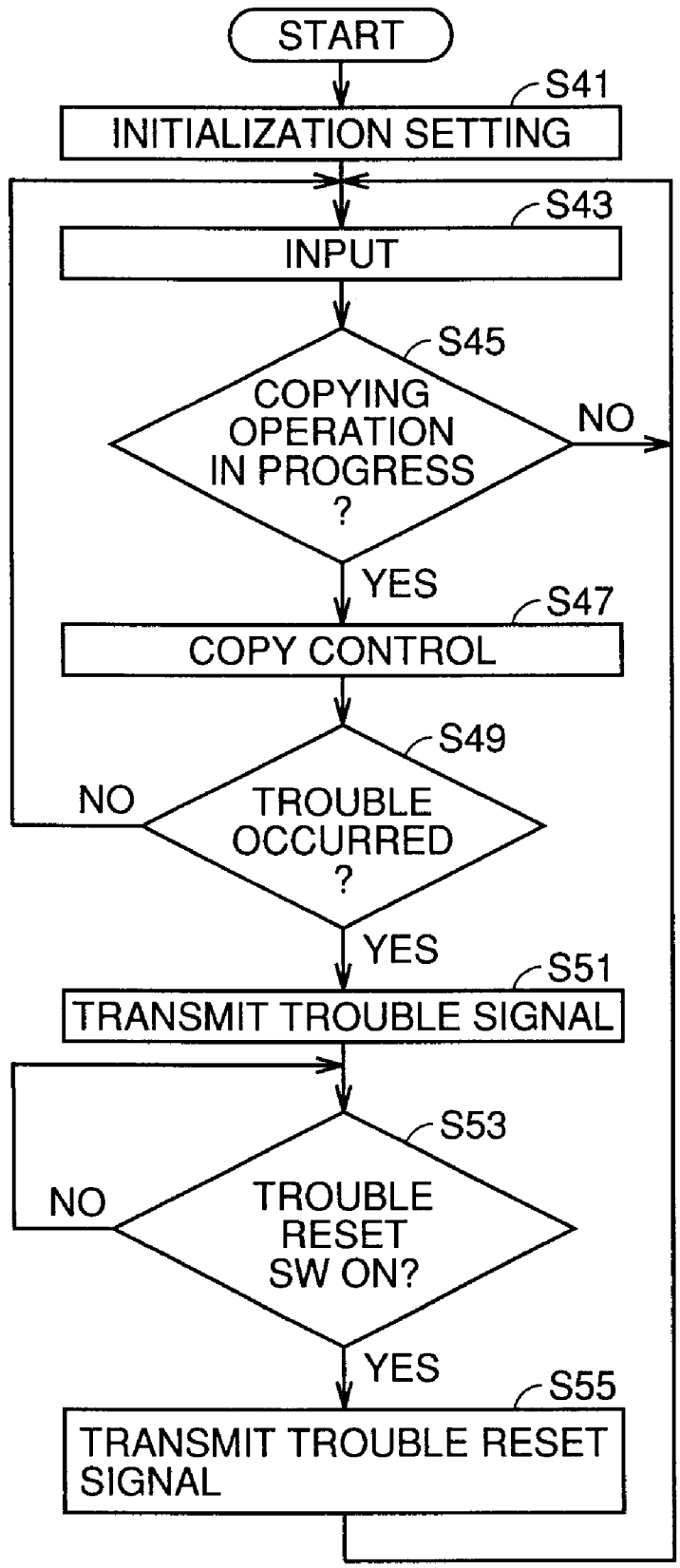
FIG. 6 is a flow chart showing a main routine of a process performed in a CPU of the copying machine of the remote diagnostic system.

An operation control of this system is next described using the flow chart in FIG. 6. Copying machines 4 and 5 perform similar processes, and accordingly only copying machine 4 is described in this embodiment.

Prior to the description, the terms of "on-edge" and "off-edge" are defined. "On-edge" is defined as transition of the states of switches, sensors, signals, and the like from an off state to an on state, and "off-edge" is defined as transition of the states from the on state to the off state.

CPU 41 starts processing upon turn-on of a power source to make initialization setting such as memory clear, standard mode setting and the like (step S41). Steps S43, S45 and S47 are successively performed in which an input is accepted, determination is made as to whether a copying operation is in progress or not, and a copy control process is performed respectively. In step S43, various input signals are accepted. The input signals refer to, for example, signals supplied from the group of key switches on operation panel 40 of the copying machine (ten-key 47 for numerical input, print key 46 for commanding start of copying operation, clear key 48 for commanding clearing of the number of sheets to be printed, and the like), signals from the group of switches such as trouble reset switch 49 and the like, and input signals from the group of sensors located at various locations within the copying machine. In step S47, those processes necessary for the copying operation or the like are performed. The necessary processes for the copying operation or the like refer to control for supplying sheets, operation control, control of the photoreceptor drum, and control of various operating parts such as control of the developing unit.

When any trouble such as improper transportation of sheets (jam), and improper control of machines or improper operation of the machine occurs (YES in step S49), a signal corresponding to the occurred trouble is transmitted to CPU 11 (step S51). When an operator or the like operates trouble reset switch 49 (YES in step S53), a trouble reset signal is transmitted to CPU 11 (S55).

A process performed in CPU 11 of data terminal 1 is next described with reference to the flow charts shown in FIGS. 7 to 14.

The outline of the processes will be described based on the main routine of FIG. 7.

CPU 11 starts processing upon turn-on of the power source. When data terminal 1 is set in an initialization setting mode (YES in step S11), a process for initialization setting (step S13) is performed. A copy permission signal is then supplied to CPU 41 of the copying machine (step S15). When the initialization setting mode is not set (NO in step S11), the copy permission signal is immediately supplied (S15), and thereafter processes in steps S17 to S35 are repeatedly carried out.

The initialization setting in step S13 is carried out when data terminal 1 is set in the initialization setting mode (YES in step S11) at the start of a process performed by data terminal 1. The initialization setting mode refers to the state in which dip switch DIP.SW4 is in ON state. In the initialization setting process, the telephone number of the central equipment, the number of the data terminal (DTID), and the number of the central equipment (central ID) are set and the set numbers are transmitted to the central equipment.

After the copy permission signal is transmitted in step S15, a count data receiving process is performed in step S17. The count data receiving process refers to a process of receiving various data concerning the state of the copying machine supplied from CPU 41. The contents of the various data include the sheet discharge code, jam.trouble code, jam.trouble count value, count values for respective sheet sizes, PM count value, and element data value. CPU 11 always holds the latest values of these data.

Next, in step S19, the element data are received and data processing is performed. The data processing refers to a process of calculating an average value and a standard deviation of the element data to update the values to the latest values.

Next in step S21, a trouble transmission determining process is performed. In this process, whether or not the trouble data and trouble recovery data should be transmitted to the central equipment is determined as will be described below.

A fixed time transmission determining processes is next performed in step S23. In step S23, a fixed time transmission flag is set to 1 at a prescribed time (fixed transmission time). Accordingly, the total count value used for calculating the cost of copying to be charged as well as the count values for respective sheet sizes are supplied to the central equipment. Simultaneously, various element data are supplied to the central equipment. After the total count value, the count values for respective sheet sizes, and various element data are transmitted, the central equipment transmits in return data on the time and date at which the next transmission is made, the present time data, and data on the time limit for sending a bill.

Next, in step S25, a warning transmission determining process is performed. In step S25, the element data, the count value of the jam counter, and the count value of the PM counter are compared respectively with prescribed threshold values. Based on the result of the comparison, whether or not warning data or warning cancellation data should be transmitted to the central equipment is determined.

In step S27, a manual transmission determining process is performed. If push switch 21 is pressed when the initialization setting mode is not set, a manual transmission flag is set to 1. Accordingly, the manual transmission determining process is executed when the manual transmission flag is set to 1 to transmit various data concerning the state of the copying machine to the central equipment.

Next in step S29, a PM transmission determining process is performed. In step S29 described below, the count value of the PM counter is cleared to 0 by replacement of parts. The PM transmission determining process is carried out for transmitting, the count value before the PM counter is cleared, to the central equipment.

In step S31, a line communication process is conducted. As described below, when any one of the fixed time transmission flag and the manual transmission flag is set to 1, modem 52 is activated. A process for connecting a communication line to the central equipment is then performed. After the communication line is connected, data communication with CPU 91 of the central equipment is performed.

Figure 16:
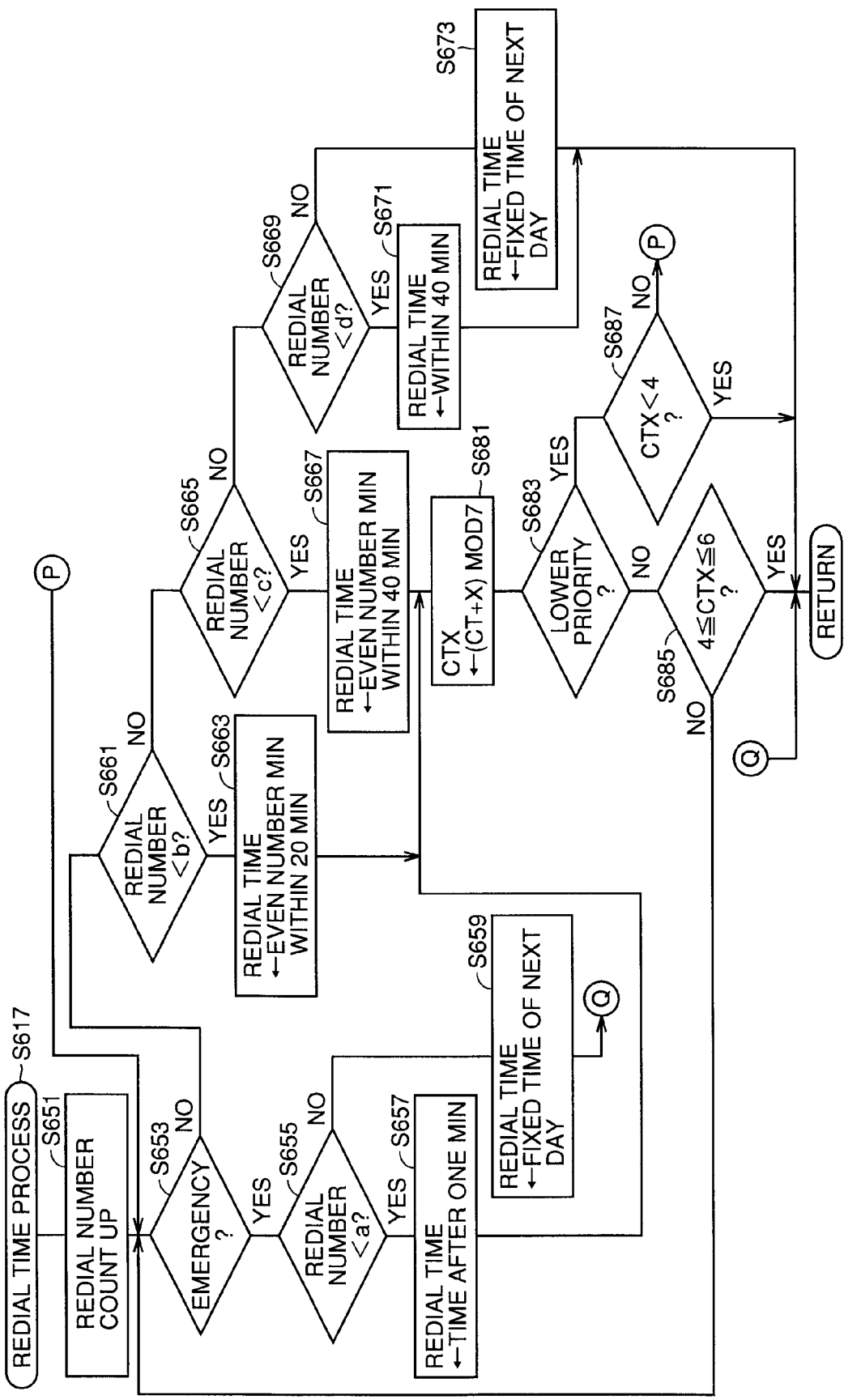
FIG. 16 is a flow chart showing a redial time process of the flow chart in FIG. 15.
Figure 17:
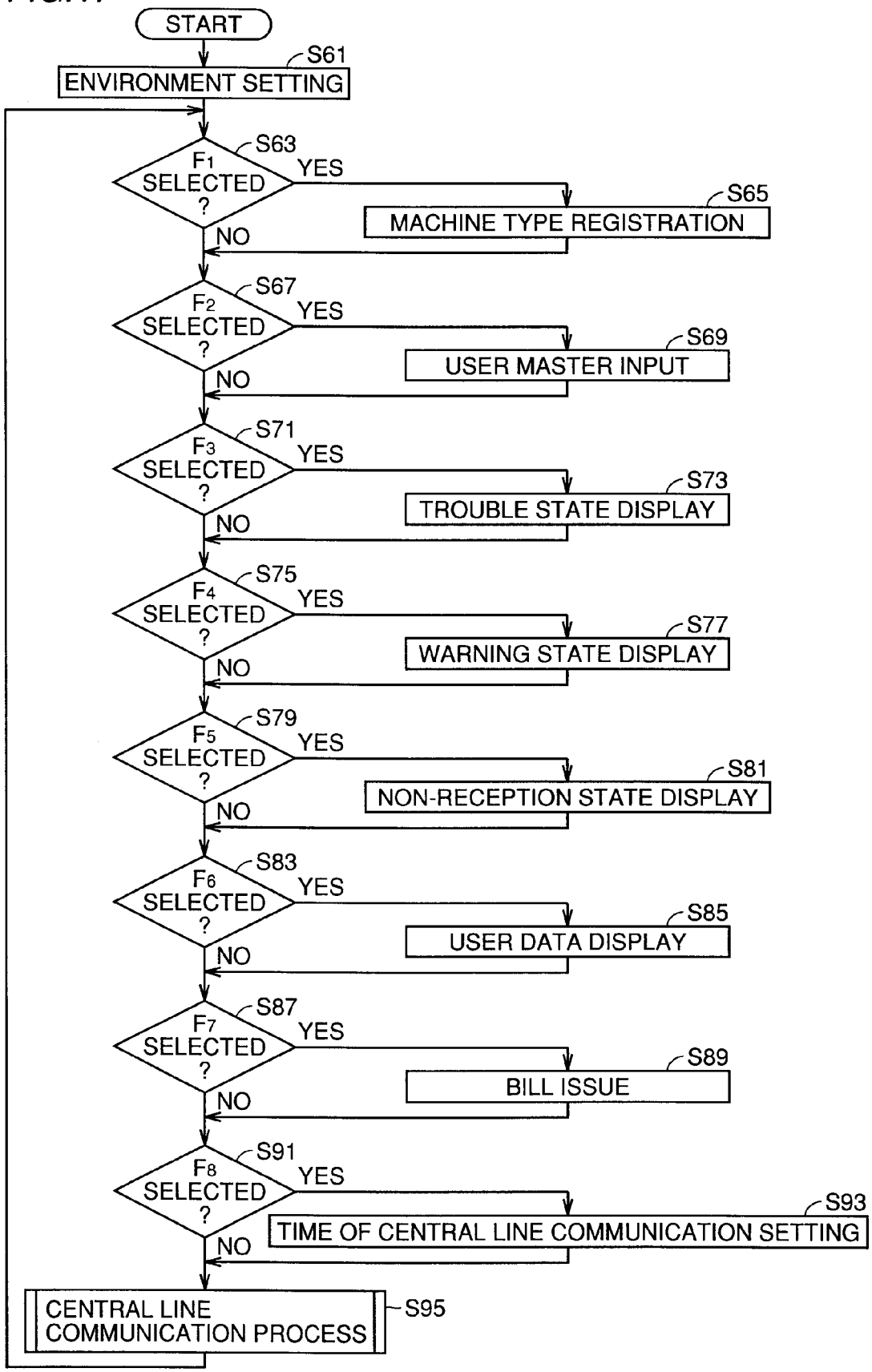
FIG. 17 is a flow chart showing a process performed in a CPU of the central equipment of the remote diagnostic system.

Next in step S33, a count up operation in the counter is executed every time one minute has passed. Upon the count up operation in the counter (YES in step S33), step S35 is performed. In step S35, 1 is added to a counter CT, and a remainder obtained by dividing the resultant value by 7 is substituted for the counter CT. Description concerning the counter CT is given in the section related to a redial time process (FIG. 16).

Figure 8:
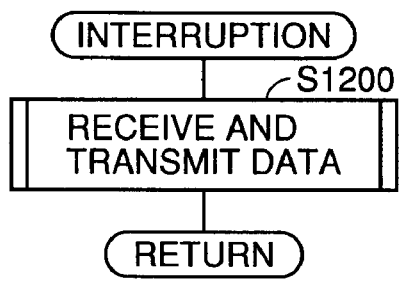
FIG. 8 is a flow chart showing a process performed in the data terminal for transmitting and receiving data by request from a central equipment.
Figure 9:
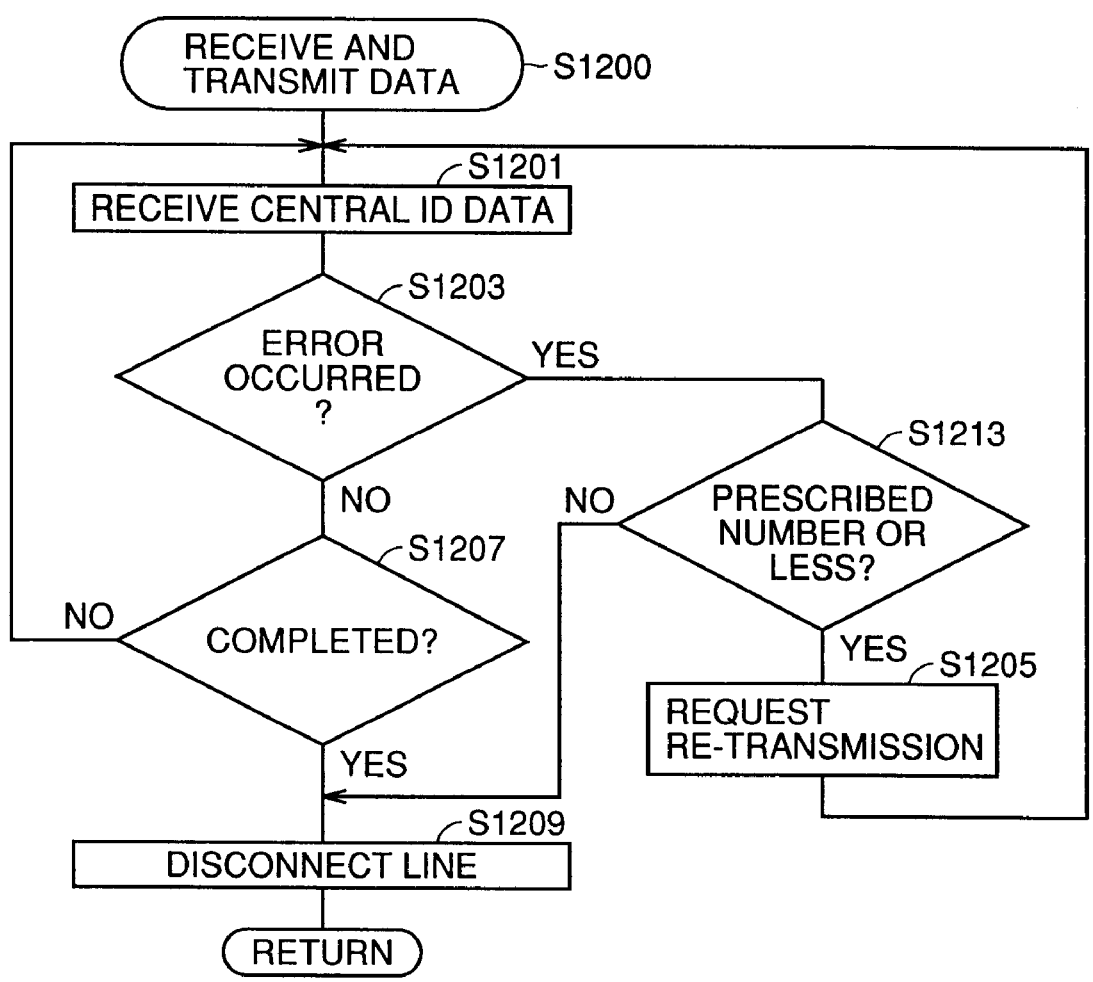
FIG. 9 is a flow chart showing a process in step S1200 of FIG. 8.

Referring to FIGS. 8 and 9, the flow charts show a case in which data are transmitted and received by a request from CPU 91 of the central equipment to data terminal 1. Although both of CPU 11 and CPU 111 are controlled according to a common program, the following description is given concerning an interruption process executed in CPU 111 when a request from the central equipment is made to data terminal 101 connected by the radio communication line.

CPU 111 receives data transmitted from CPU 91 following an interruption process, and applies a prescribed process to the supplied data (S1200). First, when an interruption by CPU 91 occurs, CPU 111 receives a central ID and transmission data (S1201). When a communication error occurs (YES in S1203), retransmission of the central ID and the transmission data is requested to the central equipment on a condition that the number of errors is equal to or less than a prescribed number (YES in S1213). If the number of errors exceeds the prescribed number (NO in S1213), the line is disconnected (S1209).

When reception of data from the central equipment and transmission of the requested data from CPU 111 are completed and thus the communication is normally completed, the line is disconnected (S1209).

Figure 7:
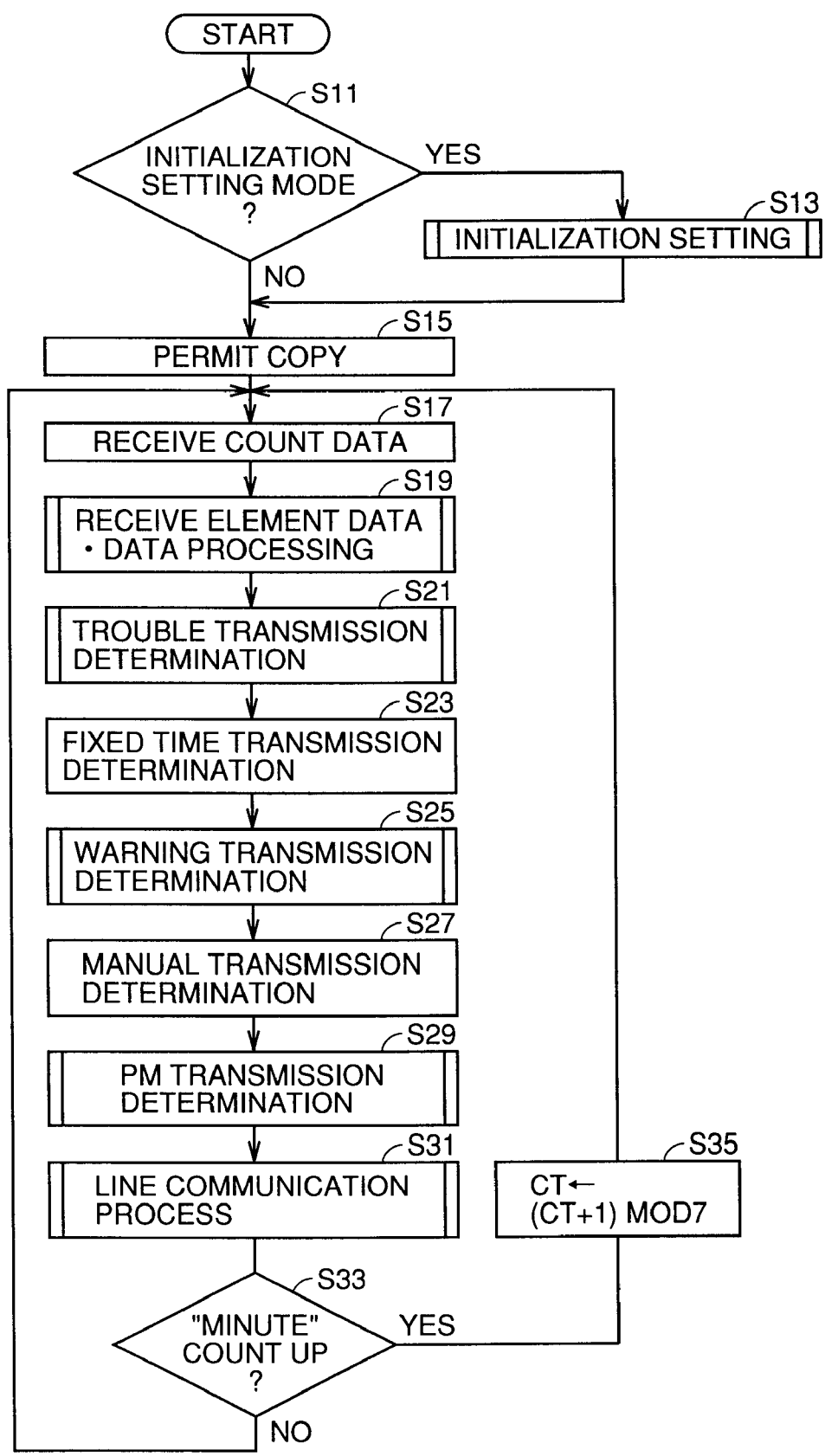
FIG. 7 is a flow chart showing a process performed in a CPU of the data terminal.

Subroutines of the main routine shown in FIG. 7 are hereinafter described referring to FIGS. 10–16.

Figure 10:
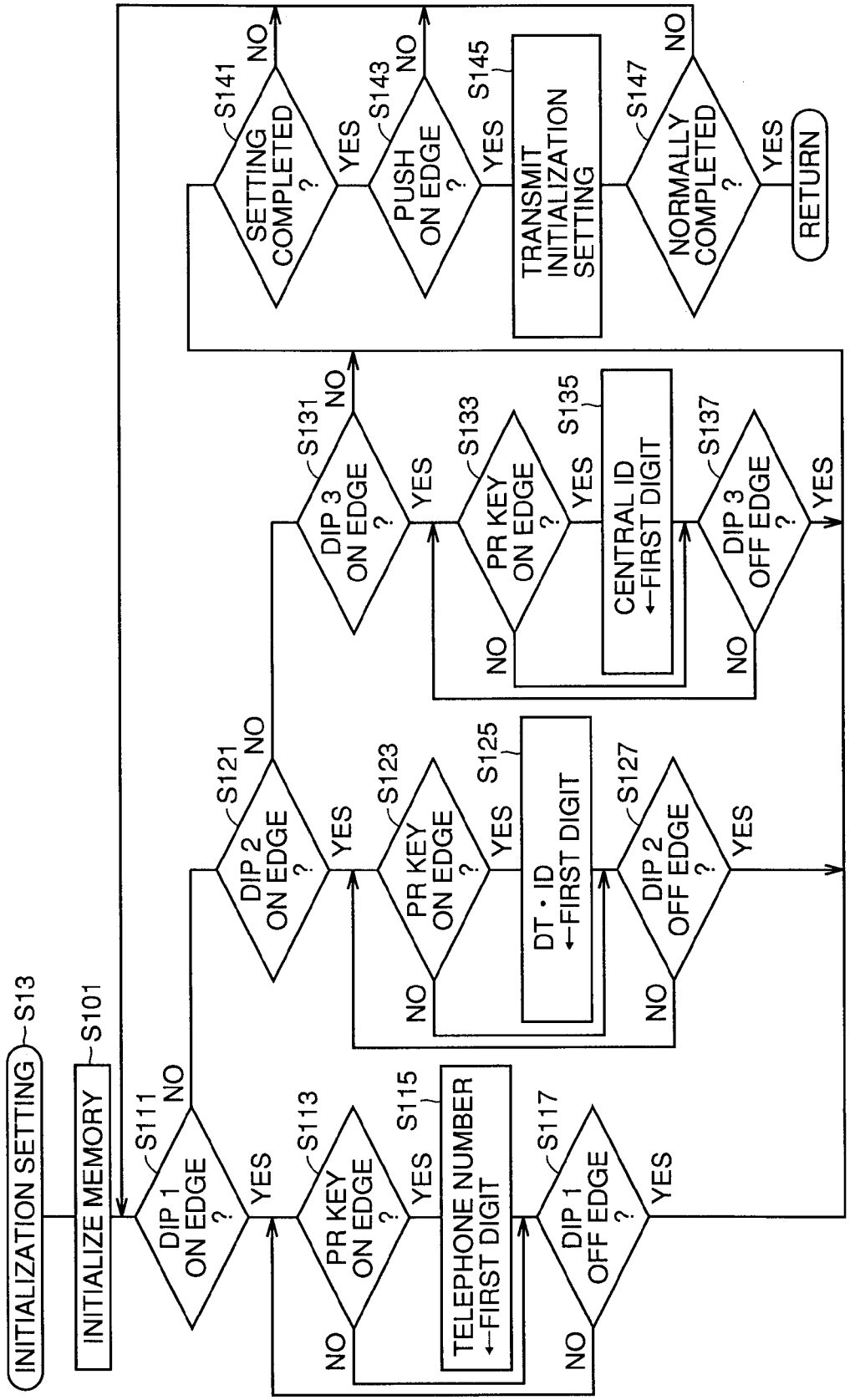
FIG. 10 is a flow chart showing an initial setting process in step S11 of the flow chart in FIG. 7.

FIG. 10 shows a subroutine of the initialization setting. The initialization setting process is conducted when dip switch DIP.SW4 is ON (YES in step S11) with the power source turned on. In the initialization setting process, after initialization setting of a selection number (telephone number) of the central equipment, an ID number (DTID) of the data terminal, and an ID number (central ID) of the central equipment are received, the initialization setting is transmitted in order to supply initialized data.

Memory 15 is first initialized (step S101). The ON operation of dip switch DIP.SW1-dip switch DIP.SW3 is set on the standby state. When dip switch DIP.SW1 is ON (YES in step S111), an input mode of the central selection number (telephone number) is ready. The selection number of the central equipment is input by ten-key 47 of the copying machine. The input numbers is indicated as the first digit of display 45 and stored in nonvolatile memory 46 as the selection number of the central equipment when print key 46 is pressed (YES in step S113). The selection number input mode is canceled when dip switch DIP.SW1 is turned off (step S117).

When dip switch DIP.SW2 is ON (YES in step S121), an input mode of DTID is ready. DTID is input by ten-key 47 of the copying machine. The input number is indicated as the first digit of display 45, and stored in nonvolatile memory 16 as DTID data (step S125) when print key 46 is pressed (YES in step S123). The DTID input mode is cancelled by turning off dip switch DIP.SW2 (S127).

When dip switch DIP.SW3 is ON (YES in step S121), an input mode of the central ID is ready. The central ID is input by ten-key 47. The input number is indicated as the first digit of display 45, and stored in nonvolatile memory 16 as the central ID data (S135) when print key 46 is pressed (YES in S133). The central ID input mode is canceled by turning off dip switch DIP.SW3 (step S137).

When the setting of those three types of data is completed (YES in step S141), push switch 21 is made valid. Pressing of push switch 21 (YES in step S143) causes transmission of initial setting to the central equipment (step S145).

Specifically, data terminal 1 transmits the two types of ID data to CPU 91 of the central equipment after line connection with central equipment is established. Upon completion of the transmission, data from CPU 91 of the central equipment (the time limit of count data, the next fixed transmission time, present time, threshold value of warning determination) are received.

When the transmission and reception is completed, whether or not the communication is normally performed is determined (step S147). If it is determined that communication is not normally performed (NO in step S147), step S11 is performed again to enter the standby state until push switch 21 is turned on again. If communication is normally conducted (YES in step S147), the process returns to the main routine to execute the process steps starting from step S15.

Figure 11:
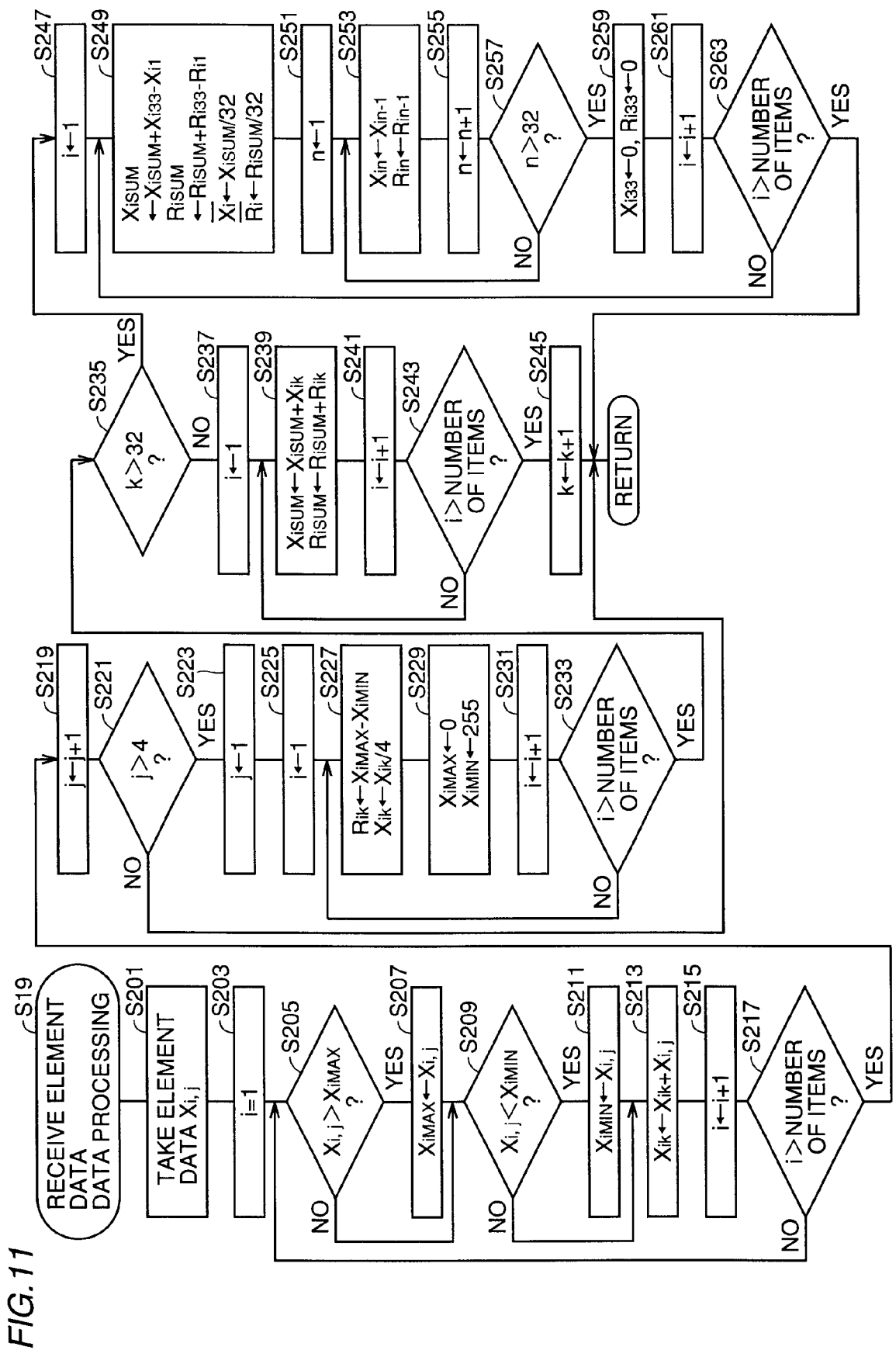
FIG. 11 is a flow chart showing an element data reception and data processing in step S19 of the flow chart in FIG. 7.

Referring to FIG. 11, the element data reception and data processing are described.

Based on element data supplied from the copying machine, data used for comparison with a threshold value (determination of warning transmission, see FIG. 3) is calculated.

A group of element data $X_{i,j}$ transmitted from the copying machine every time a copy sheet is discharged from the copying machine is taken by serial I/F 13 (step S201). Here, the subscript i represents an item number of the element data, and the subscript j represents the order in each item. After substitution of an initial value 1 for the item number i (step S203), the maximum value $X_{iMAX}$, the minimum value $X_{iMIN}$ and a sum $X_{ik}$ for each item are successively updated (steps S205–S217). The subscript j is thereafter incremented (step S219), and the process returns to the main routine if j is equal to or less than 4.

When the processes of steps S201–S217 are carried out four times respectively (YES in step S221), the subscript j is reset (step S223), an initial value is substituted for the item number i (step S225). A difference $R_{ik}$ between the maximum value $X_{iMAX}$ and the minimum value $X_{iMIN}$ and an average value $X_{ik}$ of four pieces of data are calculated for each item (steps S227–S233). In step S229, initial values are given to the maximum value $X_{iMAX}$ and the minimum value $X_{iMIN}$ in preparation for the processes in steps S205–S211 that are carried out next.

After the processes in the steps S227–S233, the processes in the steps S237–S245 or in the steps S247–S263 are carried out.

The steps S237–S245 are carried out when the total number of the processes of steps S227–S233 does not reach thirty three. In those steps, a sum $R_{iSUM}$ of the differences $R_{ik}$ between the maximum and minimum values and a sum $X_{iSUM}$ of the average values $X_{ik}$ of the four pieces of data are calculated for each item according to data obtained by the thirty two processes.

The steps S247–S263 are carried out when the total number of the processes in steps S227–S233 is thirty three or more. For each item, the sum $R_{iSUM}$ of the differences $R_{ik}$ and the sum $X_{iSUM}$ of the average values $X_{ik}$ are calculated according to data obtained by the latest thirty two processes, and respective average values $\overline{X}_i$ and $\overline{R}_i$ are calculated.

Accordingly, an average value $\overline{X}_i$ of the latest 128 (=4× 32) data and an average value of deviations (a value corresponding to the standard deviation) $\overline{R}_i$ are obtained for each item of the element data.

Figure 12:
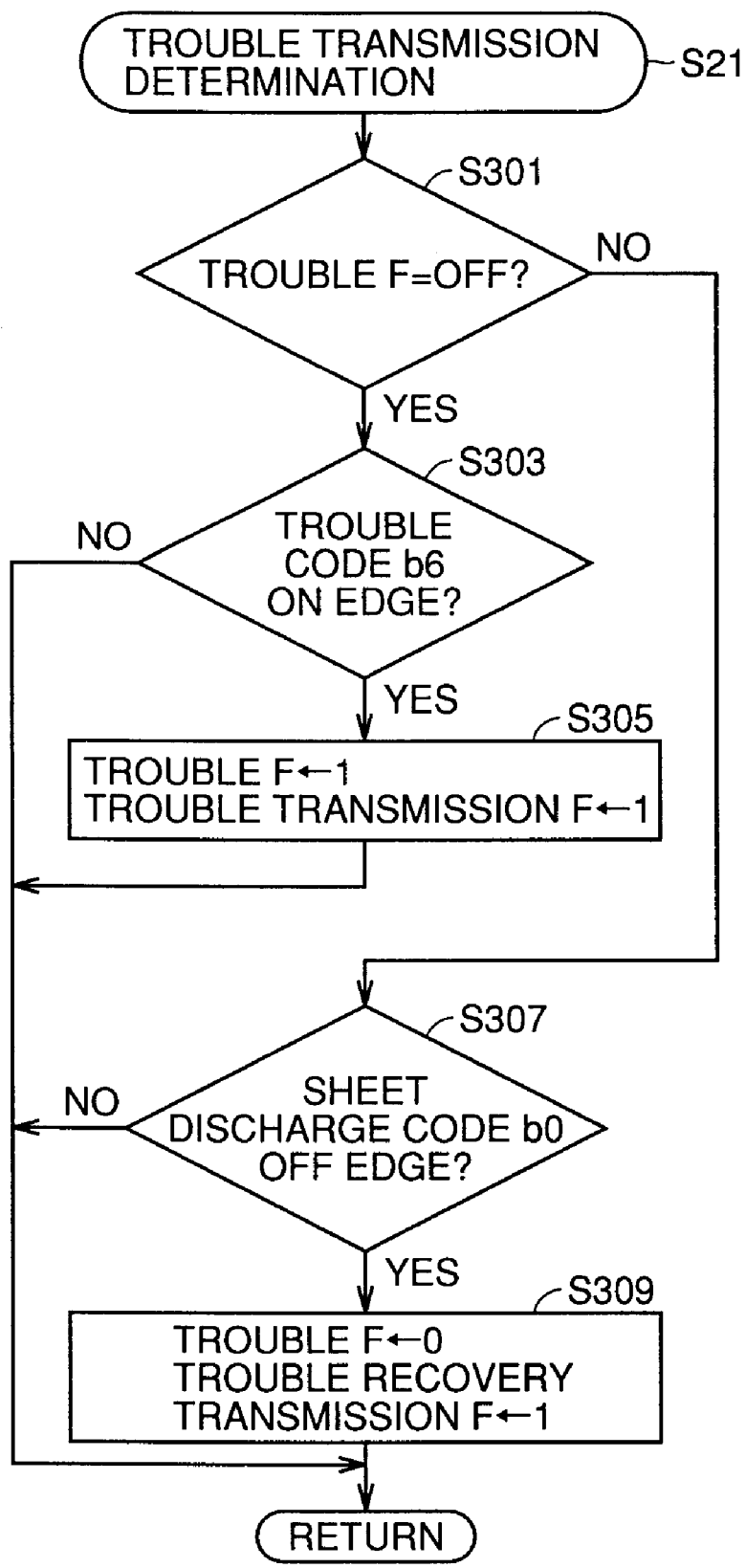
FIG. 12 is a flow chart showing a trouble transmission determining process in step S21 of the flow chart in FIG. 7.

Referring next to FIG. 12, the trouble transmission determination process is described.

In this process, a trouble transmission (emergency transmission) and a trouble recovery transmission (emergency recovery transmission) are carried out.

For example, in the condition of a trouble flag which is 0 (YES in step S301), when on-edge of trouble code b6 from the copying machine is detected (YES in step S303), the trouble flag and an emergency transmission flag are respectively set to 1 (step S305).

When the trouble flag is 1 (NO in step S301), if off-edge of sheet discharge code b0 from the copying machine is detected (YES in step S307), the trouble flag is reset to 0 and a trouble recovery transmission flag is set to 1 (step S309). This is because discharging of a sheet from the copying machine is considered to indicate recovery from the trouble.

When the trouble transmission flag or the trouble recovery transmission flag is set to 1, a line communication process (see FIG. 15) described below is conducted to transmit trouble data or trouble recovery data to CPU 91 of the central equipment.

Figure 13:
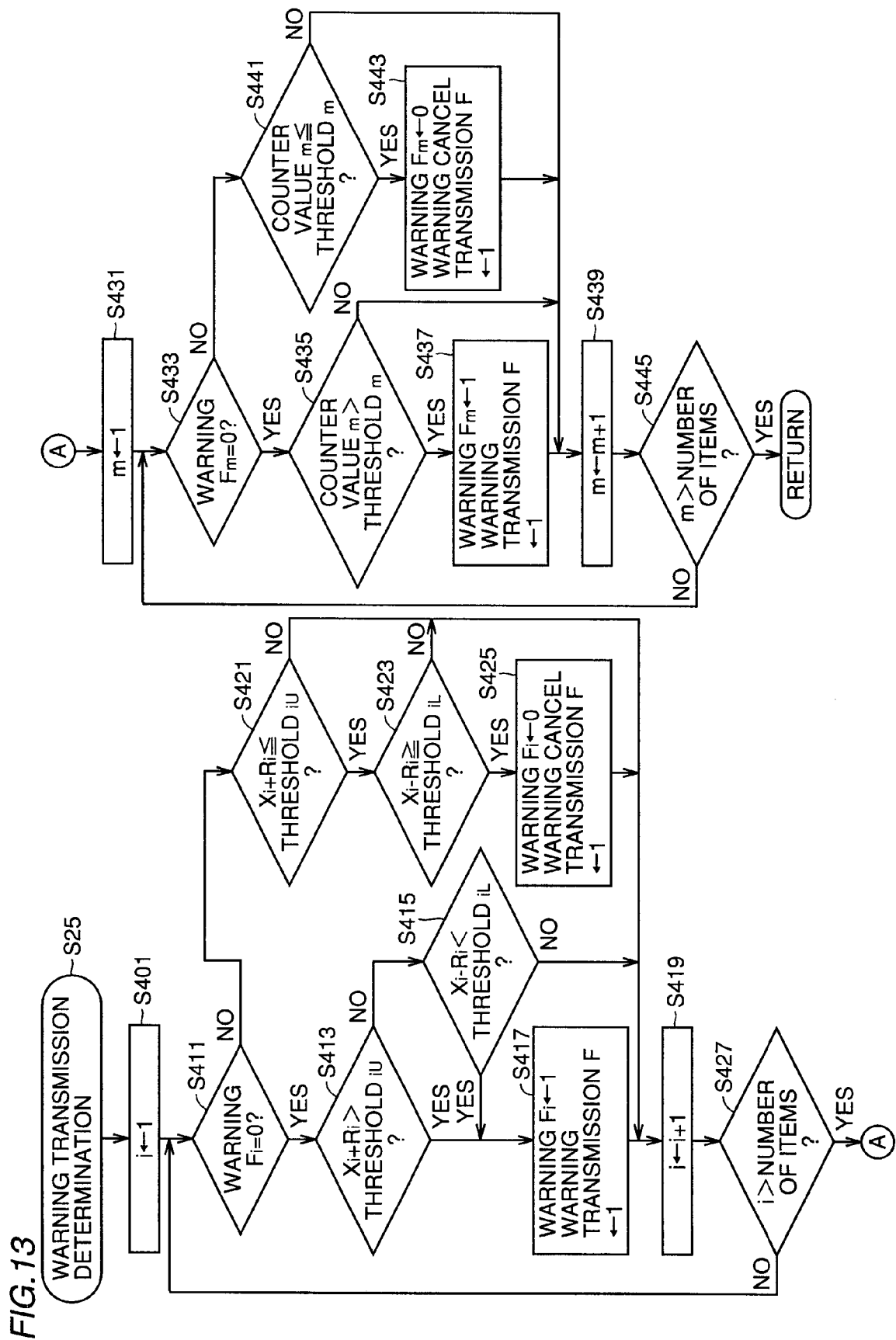
FIG. 13 is a flow chart partially showing a warning transmission determining process in step S25 of the flow chart in FIG. 7.

Referring next to FIG. 13, the warning transmission determination process is described.

In this process, warning transmission and warning cancel transmission are controlled.

Steps S401–427 are performed for transmitting warning when the value of the element data is out of a particular allowable range or for transmitting warning cancel when the value of the element data returns into the allowable range.

First, an initial value "1" is set in the item number i indicating the type of the element data (step S401). Next in step S411, a warning flag concerning element data designated by the item number i (at the first time, the first element data) is determined. If the warning flag concerning the element data is 0 (YES in step S411), determination is made as to whether the value of the element data is within the allowable range specific to the element data, in other words, whether the value of the element data is in the range not more than an upper limit threshold value iU and not less than a lower limit threshold value iL. If the value of the element data is out of the allowable range (YES in step S413 or YES in step S415), warning flag Fi and warning transmission flag F concerning the element data are set to 1 (step S417). Accordingly, the line communication process (FIG. 15) is performed to transmit warning data to the central equipment.

If the warning flag of the element data designated by the item number i is 1 (NO in step S411), whether or not the value of the element data falls again in the allowable range is determined. If the value of the element data is within the allowable range (YES in S421 and YES in S423), warning flag Fi concerning the element data is reset to 0 and warning cancel transmission flag F is set to 1 (step S425). Accordingly, the line communication process (FIG. 15) is performed to transmit the warning cancel data to the central equipment.

After those processes are conducted for all element data (YES in step S427), the processes starting from step S431 are performed.

In steps S431–S445, warning transmission is done when the count values of the jam counter and the PM counter exceed specific threshold values, and warning cancel transmission is done when the count values equal to a less than the threshold values.

First, an initial value i (the value of the last item number of element data +1) is set in item number m indicating the type (jam counter or PM counter) (step S431).

Next in step S433, a warning flag concerning the jam counter or the PM counter designated by the item number m is determined. If the warning flag concerning the jam counter or the PM counter is 0 (YES in step S433), determination is made as to whether the count value is within an allowable range specific to the counter, in other words, whether or not the count value exceeds a threshold value m. If it exceeds the threshold value (YES in step S435), warning flag Fm and warning transmission flag F relating to the counter are set to 1 (step S437). In response, the line communication process (FIG. 15) is conducted to transmit warning data to CPU 91 of the central equipment.

In step S433 described above, if the warning flag concerning the jam counter or the PM counter designated by the item number m is 1 (NO in step S433), determination is made as to if the count value is equal or less than the threshold value. If the count value is equal to or less than the threshold value (YES in step S441), warning flag Fm concerning the counter is reset to 0 and the warning cancel transmission flag F is set to 1. In response, the line communication process (FIG. 15) is conducted to transmit warning cancel data to CPU 91 of the central equipment.

After those processes are performed for all jam counters and PM counters (YES in step S445), the process returns to the main routine.

Accordingly, warning transmission and warning cancel transmission are controlled.

Figure 14:
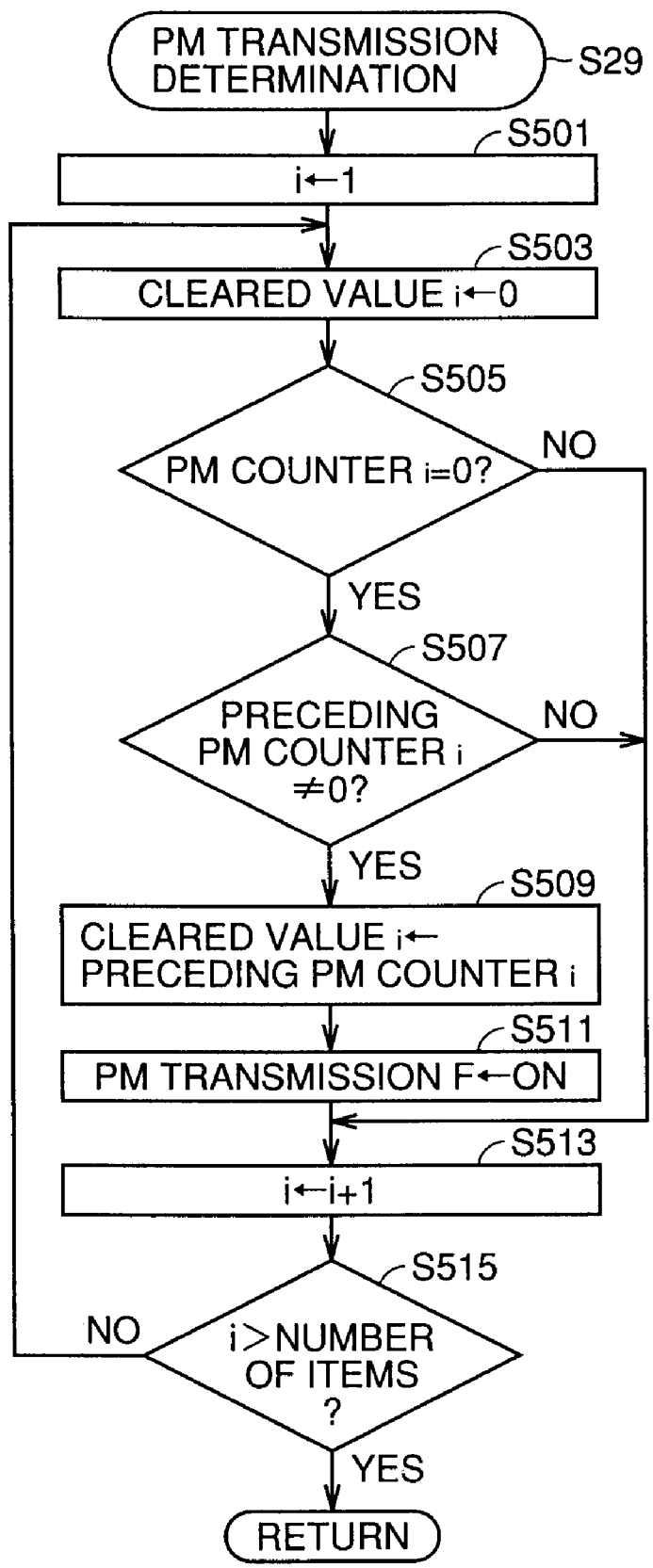
FIG. 14 is a flow chart showing a PM transmission determining process in step S29 of the flow chart in FIG. 7.

Referring to FIG. 14, the PM transmission determination process is described.

First, an item number i indicating the type of the PM counter is set to an initial value "1" (step S501). Next the processes in steps S503–S511 are carried out and the value of i is incremented (step S513), and accordingly those processes are repeated. Specifically, those processes are repeated changing the type of the PM counter.

In the processes of steps S503–S511, when the PM counter is cleared (YES in step S505 and YES in step S507), a count value immediately before clearing of the PM counter is retained (step S509), and a PM transmission flag is set to 1 (step S511). The clearing of the PM counter is done by a service person when the parts corresponding to the PM counter are replaced.

After the PM transmission flag is set to 1 (step S511), the line communication process (FIG. 15) is performed to transmit PM data (the type of replaced parts and the count value immediately before the replacement) to the central equipment.

Figure 15:
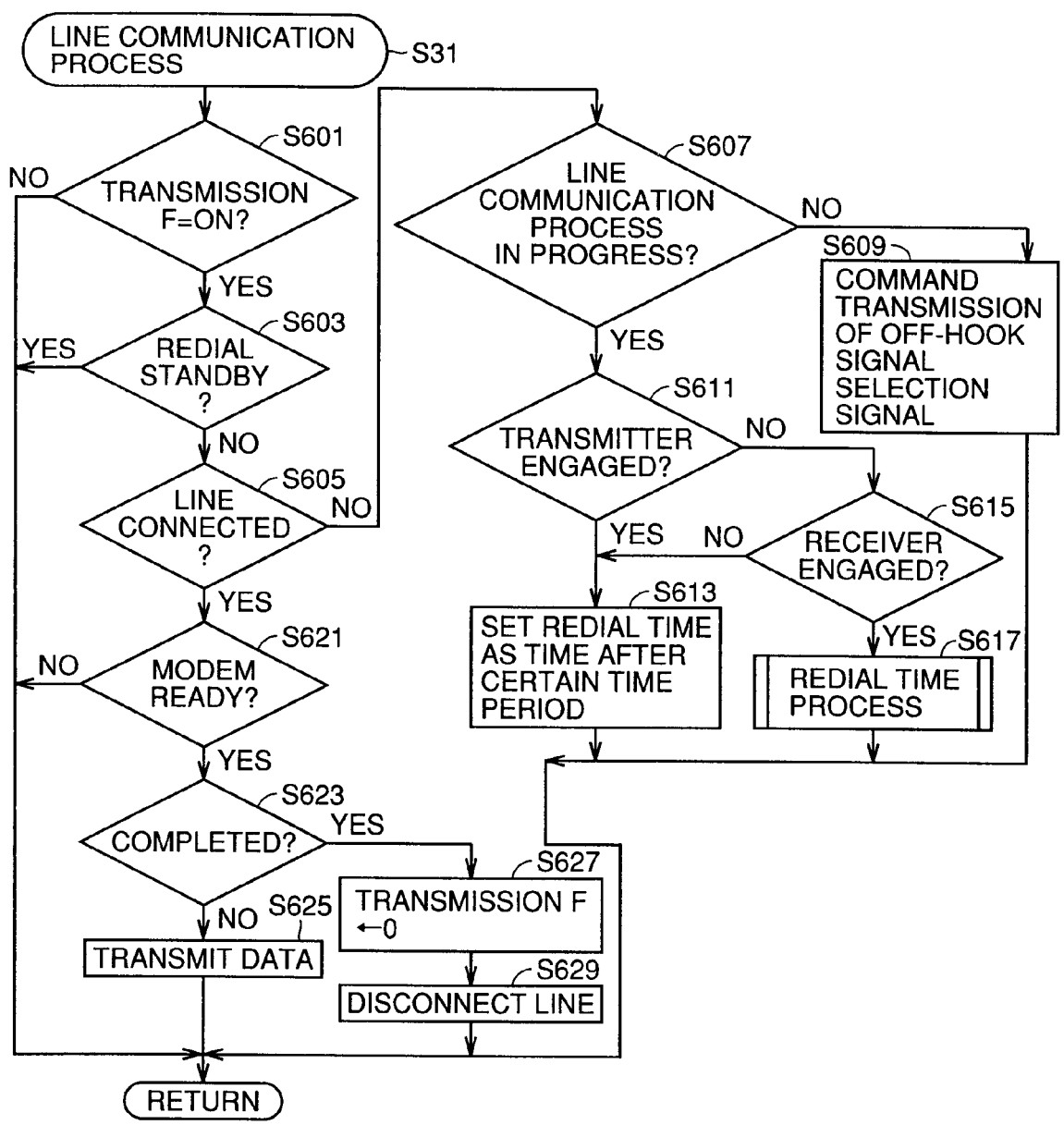
FIG. 15 is a flow chart showing a line communication process in step S31 of the flow chart in FIG. 7.

Referring to FIG. 15, the line communication process is described.

In this process, when any transmission flag is 1, the central equipment is called. After the communication line is connected, data corresponding to the transmission flag is sent. Further, data communication with CPU 91 of the central equipment is conducted.

When any transmission flag is set to 1 (YES in step S601), on the conditions that it is not in a redial standby state (NO in step S603), the communication line is not connected to modem 72 of the central equipment (NO in step S605), and it is not in the standby state after calling of modem 72 of the central equipment is requested to modem 52 (NO in step S607), modem 52 is commanded to call modem 72 of the central equipment (S609).

As a result of the process in step S609, if a telephone set provided in conjunction with the communication line is in use and calling of modem 72 of the central equipment is impossible (YES in step S611), a redial time is set as the time after a prescribed time period (step S613). Accordingly, the determination made in step S603 is "YES" by the redial time. In other words, the process in step S609 is not performed. At the redial time, modem 52 is commanded to call modem 72 of the central equipment again (step S609).

In response to the process in step S609, a selection signal of the central equipment is transmitted to the telephone line network from modem 52. At this time, if it is determined that modem 72 of the central equipment is in use (including the case in which there is no response from CPU 91 even if connection with modem 72 is established) (YES in step S615), step S617 is next carried out. If not (NO in step S615), step S613 is performed in which the redial time is set as described above and the process in step S609 is executed again at the set redial time. The redial time process in step S617 will be described later.

In response to the process in step S609, the selection signal of the central equipment is transferred over the communication line network from modem 52. When the communication line is connected with modem 72 of the central equipment (YES in step S605), data corresponding to the transmission flag which is set to 1 is transmitted to the central equipment (step S625) after waiting for the ready state of modem 52 (YES in step S621).

When there is no data to be transmitted to the central equipment (NO in step S623), data transmitted from the central equipment is received (step S625).

Examples of data supplied from the central equipment are, an instruction for changing the setting conditions of the copying machine (setting change instruction), an instruction requiring operation of the copying machine (operation instruction), or the present time, the following fixed transmission time and date, the following time limit transmission time and date, and the like. If a communication error occurs, retransmission instruction of data is received.

After all data are transmitted (YES in step S623), the transmission flag F is reset to 0 (step S627), and the communication line connected with modem 72 of the central equipment is disconnected (step S629).

Accordingly, the line communication process is completed to transmit data to the central equipment and receive data from the central equipment as required.

Referring to FIG. 16, the redial time process is described.

In this process, re-calling (redialing) time is set when the data terminal cannot be connected to the central equipment due to any condition of the central equipment.

First, a counter for counting the number of times redialing is done (redial counter) counts up (step S651). After connection with the central equipment is established, the counter is cleared.

Next, determination is made as to whether the present calling is a calling in an emergency mode (trouble transmission). If it is in the emergency mode (YES in step S653), on the condition that the value of the redial counter is equal to or less than a (approximately 10–20) (YES in step S655), the time one minute after the present time is set as the next calling (redial) time (step S657). In other words, in the emergency mode, the central equipment is called every minute until the number of redialing operations exceeds a. However, if the set time is within a time range in which transmission is inhibited (NO in step S685 and NO in step S687), the redial time is set again. Steps S681–S687 are described later.

When the number of redial operations in the emergency mode exceeds a (NO in step S655), a prescribed time on the next day is set as the redial time (step S659). This is done in order not to occupy the telephone set of the user when connection with the central equipment cannot be established (possibly due to any abnormal condition of the line or operation stop of the central computer) inspite of the calling operation repeated a times.

On the other hand, when it is determined that the present calling is not in the emergency mode (trouble transmission) (NO in step S653), in other words, the calling operation is caused by any factor except for the trouble transmission, on the condition that the redial counter value is equal to or less than b (approximately 20–30) (YES in step S661), an arbitrary even minute time within 20 minutes from the present time is selected based on a random number, and set it as the next calling (redial) time (step S663). Specifically, the redial operation is done at an appropriate time within 20 minutes. This is done in order to increase the possibility of connecting each device to the central equipment by dispersing the redial times of respective data terminals even when a number of data terminals call the central equipment. However, similarly to the emergency case, if the set time is within the range of time in which transmission is inhibited (NO in step S685 and NO in step S687), the redial time is set again.

In a non-emergency mode, if the number of redial operations exceeds b (NO in step S661), on the condition that the number is equal to or less than c (from 30 to 40) (YES in step S665), an arbitrary even minute time within 40 minutes from the present time is set as the next calling (redial) time similarly by using the random number (step S667). In other words, the redial operation is done at a proper time within 40 minutes. This is done in order to further increase the possibility of connecting respective devices to the central equipment by dispersing the redial times of respective data terminals in a range wider than that of step S663 when a number of data terminals call the central equipment. However, the redial time is set again when the set time is within the time range in which transmission is inhibited (NO in step S685 and NO in step S687) similarly to the case above.

In the non-emergency mode, if the number of redial operations exceeds c and is equal to or less than d (from 40 to 50) (YES in step S669), an arbitrary time within 40 minutes from the present time is set as the next calling (redial) time (step S671). Specifically, the condition of the even number minute time is canceled and the number of times which can be selected is increased compared with the case of step S667 to further increase the possibility of connection to the central equipment. Even if the set time is within the time range in which transmission is inhibited, steps S681 to S687 are skipped and the process is directly returned.

In the non-emergency mode, if the number of redial operations exceeds d (NO in step S669), a prescribed time of the next day is set as the redial time (step S673). It is done in order to avoid occupation of the telephone line of the user when connection with the central equipment cannot be established (possibly due to any abnormal state of the line, operation stop of the central computer and the like) even if calling operation is done d times.

In the processes of steps S681–S687, the redial time is set again when the set redial time is within the time range in which transmission is inhibited (NO in step S685 or NO in step S687).

Figure 21A:
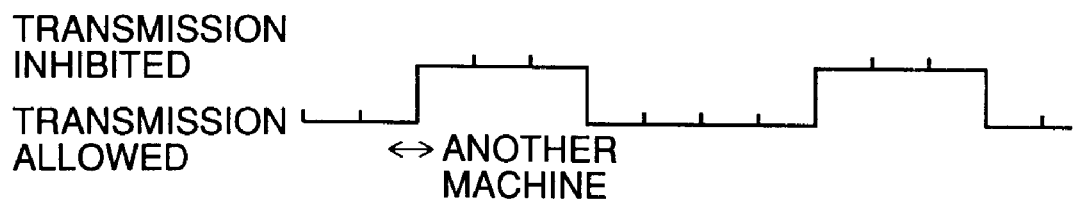
FIGS. 21A and 21B illustrate time ranges where transmission is allowed and inhibited based on the priority.
Figure 21B:
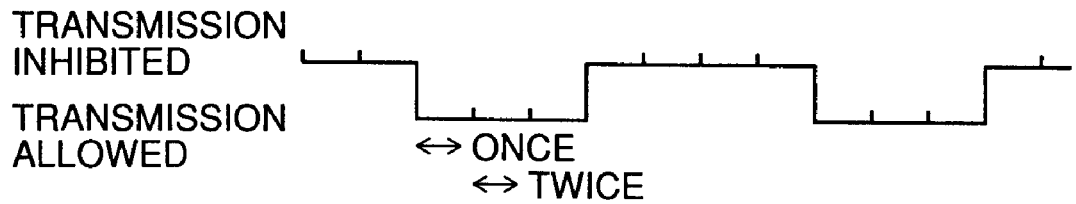

As shown in FIG. 7, CPU 11 performs the count up operation every minute (YES in step S33), increments counter variable CT one by one, and substitutes the remainder obtained by dividing the incremented value by 7 for the counter variable CT (step S35). Specifically, the value of counter CT changes in rotation every one minute as 0, 1, 2, 3, 4, 5, 6, 0, 1, . . . Counter CT=0–3 corresponds to a time range in which transmission with lower priority is allowed, and counter CT=4–6 corresponds to a time range in which transmission with a higher priority is allowed (see FIGS. 21A and 21B).

The present time X is added to the counter CT by the process in step S681. The obtained value is divided by 7 to obtain the remainder. The remainder is substituted for counter variable CTX to render counter variable CTX corresponding to the CT. Specifically, CTX=0–3 corresponds to the time range in which transmission with a lower priority is allowed, and counter CTX=4–6 corresponds to the time range in which transmission with a higher priority is allowed. Accordingly, determination made in steps S685 and 687 can be done.

Figure 18:
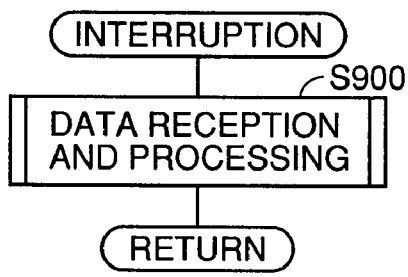
FIG. 18 is a flow chart showing an interruption process performed in the CPU of the central equipment of the remote diagnostic system.

Accordingly, the transmission-allowable time range is allocated depending on the priority of transmission. The possibility of connection with the central equipment can be enhanced for each transmission. Specifically, even if connection cannot be established at the first time as shown in FIG. 18, when transmission with a higher priority is requested again, transmission with a lower priority is completed and transmission with a lower priority is inhibited, so that the possibility of connection with the central equipment is enhanced.

Referring next to FIGS. 17–20, control of an operation of the computer of the central equipment (process in CPU 91) is described.

CPU 91 starts processing upon turn-on of the power source. Environment setting of a modem, a printer and the like is first carried out (step S61). In response to key input operations of F1–F7 described below, following modes are set or respective processes are carried out.

When F1 key is selected (YES in step S63), a machine type registration accept mode is set (step S65). Specifically, the name of the machine type, the number of items of the element data, the name of each element data, the standard threshold of each element data, the standard threshold of each count data and the like are newly registered.

When F2 key is selected (YES in step S67), a user master registration accept mode is set (step S69). Specifically, the name of user, address, telephone number, machine type name, machine number, date and time of fixed transmission and the like are newly registered. Further, an ID number for identifying the data terminal (DTID) is automatically set.

When F3 key is selected (YES in step S71), trouble states are displayed (step S73). Specifically, user information (user name, address, telephone number, machine type name) of a copying machine which transmits emergency, and the date and time of trouble occurrence and the like are displayed with details of the trouble on display 92. Regardless of the operation of F3 key, the number of troubles is always displayed on the corner of display 92.

When F4 is selected (YES in step S75), warning states are displayed (Step S77). Specifically, user information of a copying machine for which warning is transmitted is displayed with details of the warning on display 92. Regardless of the operation of F4 key, the number of warnings is always displayed on the corner of display 92.

When F5 key is selected (YES in step S79), a non-reception state is displayed (step S81). Specifically, user information of a copying machine which does not make a fixed time transmission even after a prescribed fixed transmission time is displayed on display 92. Regardless of the operation of F4 key, the number of non-reception cases is always indicated on the corner of display 92.

When F6 key is selected (YES in step S83), a user data display mode is implemented (step S85). That is, when a user is selected, user information is indicated on display 92. When a submenu is selected, the count values of various counters (total counter, sheet size counter, jam counter, trouble counter, PM counter) of the user copying machine and the element data are displayed for each month and each item.

When F7 key is selected (YES in step S87), a bill is printed (step S89). A printer connected to computer 90 is activated to print out a bill with copying cost calculated based on the count value of the total counter and a prescribed calculation formula.

When F8 key is selected (YES in step S91), a mode in which the time of line communication from the central equipment is set is implemented (S93). Specifically, the time of making line communication from the central equipment to each of copying machines 5 connected with CPU 91 of the central equipment through radio communication lines is set. Accordingly, the time of line communication to the copying machine group connected by the radio communication lines can be set, for example, at hours of odd numbers such as p.m. 1 o'clock, p.m. 3 o'clock, and p.m. 5 o'clock or hours of even numbers, only in the morning or in the afternoon, on Monday, Wednesday, Friday or another day, odd number dates such as 1, 3, 5 or even number dates.

In step S95, it is determined whether or not it is the time of line communication from the central equipment described above, and if it is the line communication time, a process of line communication from the central equipment is performed. This process is described below using FIG. 20.

Figure 19:
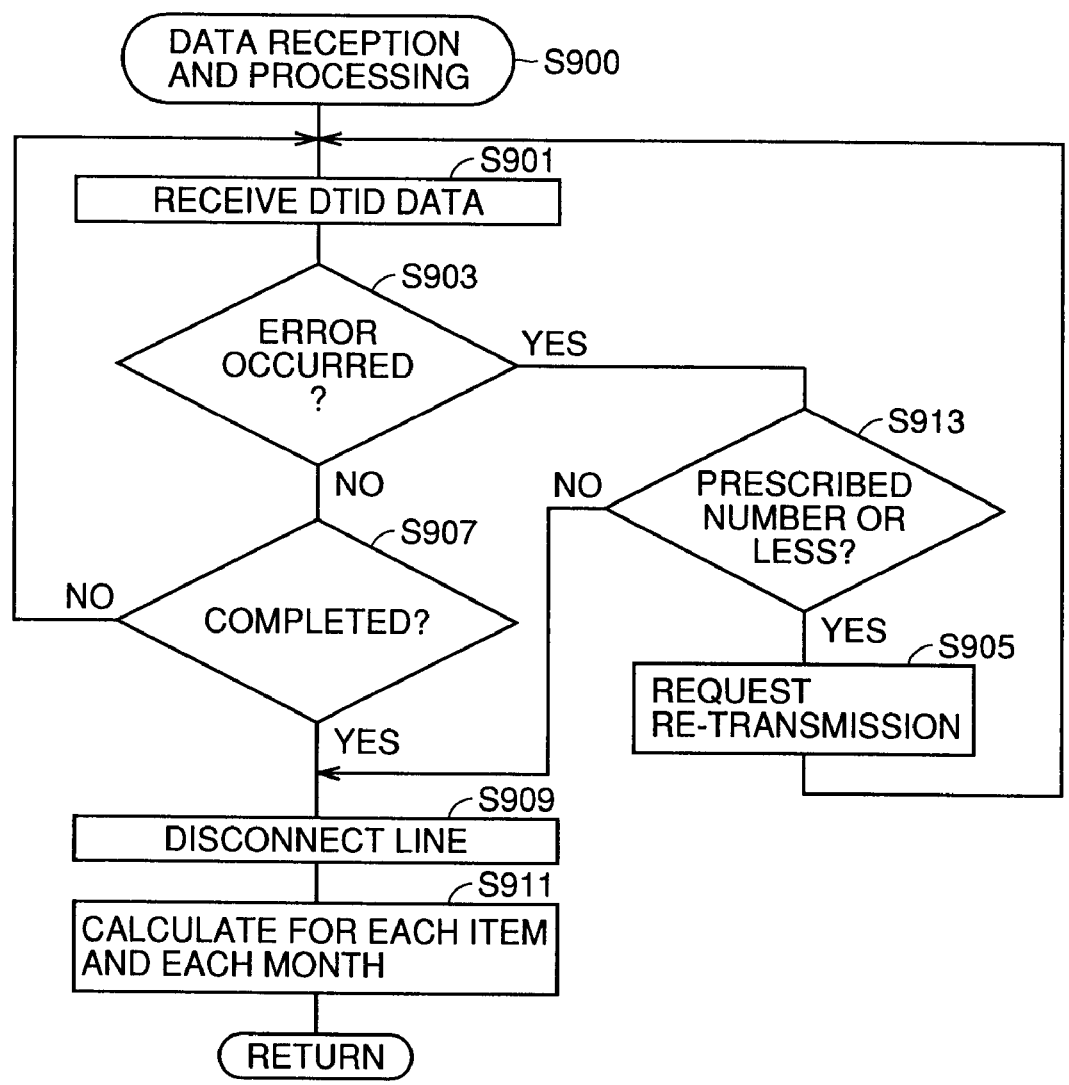
FIG. 19 is a flow chart showing a process in step S91 of the flow chart in FIG. 18.

Referring to FIGS. 18 and 19, an interruption process in CPU 91 is described.

CPU 91 receives data supplied from the data terminal following an interruption process, and applies a prescribed process to the supplied data (S900).

When an interruption command is issued by the data terminal, CPU 91 receives an ID number (DTID) for identifying the data terminal and transmission data (S901). When any communication error occurs (YES in step S903), on the condition that the number of errors is equal to or less than a prescribed number (YES in step S913), retransmission of the ID number (DTID) for identifying the data terminal and the transmission data is requested to the data terminal (step S905). If the number of errors exceeds the prescribed number (NO in step S913), CPU 91 disconnects the line (step S909).

When the communication is normally completed (YES in step S907), the line is disconnected (step S909). Data is then produced for each item and each month as data for screen display by selection by the operator (step S911). The normal completion of communication refers to the case in which the ID number (DTID) for data terminal identification and the transmission data supplied from the data terminal can be received without error and data can be transmitted from the central equipment as necessary.

If the communication follows the fixed time transmission setting, the next fixed transmission time and date, time limit transmission time and date, and the present time are transmitted to the data terminal.

Figure 20:
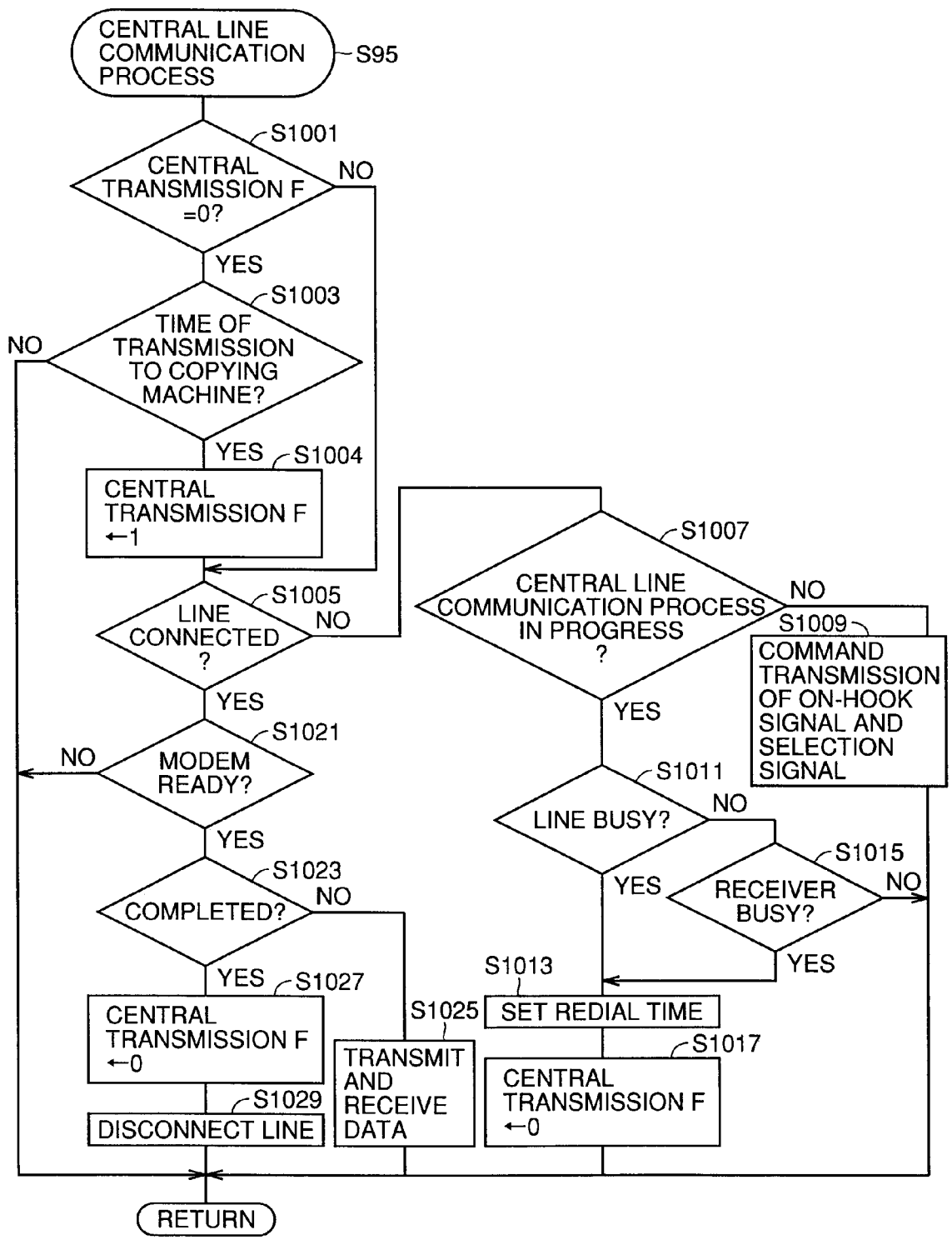
FIG. 20 is a flow chart showing a process in step S95 of the flow chart in FIG. 17.

Referring to FIG. 20, a central line communication process is described.

When a central transmission flag F is 0 (YES in step S1001), that is, no data transmission and reception process is performed for any copying machine (YES in step S1003), it is determined whether or not it is the time for transmission to any copying machine. The transmission time to the copying machine is preliminary registered. When it is the time for transmission to any copying machine, in step S1004, the central transmission flag is set to 1. On the conditions that no line is connected to the data terminal (NO in step S1005), and the process is not in the standby state after transmission of an off-hook signal and a selection signal is commanded (NO in step S1007), transmission of the off-hook signal and the selection signal is commanded to modem 152 (step S1009).

After the process in step S1009, if the radio communication line is busy (YES in step S1011), or the data terminal on the receiver side is busy (YES in step S1015), the redial time is newly set (step S1013). The busy state of the data terminal on the receiver side refers to the state in which the copying machine is in use and all the data cannot be determined. The new redial time is set at any time which is not used in the time range of transmission to the data terminal connected by the radio line. In step S1017, the central transmission flag is set to 0.

In response to the process in step S1009, the off-hook signal and the selection signal are transmitted from modem 172 over the radio communication line network. Connection with modem 152 of the data terminal by the radio communication line is made (YES in step S1005), and data is transmitted and received to and from the data terminal (step S1025) after modem 172 reaches the ready state (YES in step S1021). When a regular communication is made, transmission from the central equipment to the data terminal corresponds to the data transmission request, and the data terminal which receives the data transmission request supplies data necessary for the regular communication to the central equipment. The procedure of the transmission and reception here is referred to as transmission and reception in the description of the embodiment.

After all the data are transmitted (YES in step S1023), the central transmission flag is reset to 0 (step S1027), and the line connected to modem 152 of the data terminal is disconnected (step S1029).

The central line communication process is thus performed to transmit data to the data terminal and to receive data from the data terminal by the central equipment.

Although the present invention is directed to the copying machine and the remote diagnostic system for remotely diagnosing the copying machine in this embodiment, a remote diagnostic system for remotely diagnosing the state of any machine such as an automatic bending machine may be applied. In other words, the embodiment can be modified within the spirit of the invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote diagnostic system comprising:
a plurality of terminals each having means for enabling transmission and reception of data relating to the operation of devices connected respectively to said plurality of terminals; and
a computer having means for transmitting and receiving data to and from said plurality of terminals at a prescribed time interval for purposes of diagnosing the operation of said devices, wherein
said plurality of terminals includes a first group of at least one terminal receiving from said computer a start signal for starting transmission and reception of data, and a second group of at least one terminal transmitting to said computer a start signal for starting transmission and reception data.

2. The remote diagnostic system according to claim 1, wherein
said first group and said second group transmit and receive data to and from said computer in different time ranges respectively.

3. The remote diagnostic system according to claim 1, wherein
said second group of terminals transmits and receives data to and from said computer by means of a line that is separately allocated to said second group, and
said first group of terminals transmits and receives data to and from said computer by means other than a line that is separately allocated to said first group.

4. The remote diagnostic system according to claim 1, wherein
transmission and reception of data between said plurality of terminals and said computer include radio communication.

5. The remote diagnostic system according to claim 1, wherein
said second group transmits said start signal to said computer at a prescribed time, and
said prescribed time is included in data that said second group receives from said computer.

6. The remote diagnostic system according to claim 5, wherein
said prescribed time is specific to each terminal of said second group.

7. The remote diagnostic system according to claim 1, wherein
said computer includes redialing means for transmitting said start signal after a prescribed time period has passed when transmission and reception of data cannot be started even if said start signal is transmitted to said first group.

8. The remote diagnostic system according to claim 7, wherein
said redialing means changes said prescribed time period based on the number of times said start signal is transmitted.

9. The remote diagnostic system according to claim 7, wherein said redialing means changes said prescribed time period based on a present time.

10. A terminal connected to a device to transmit to a computer a state of said device by transmitting and receiving data to and from said computer, comprising:

communication means for transmitting and receiving data to and from said computer;

clock means for measuring time; and means for setting a prescribed time, wherein said communication means transmits to said computer a start signal for starting transmission and reception of data when the measurement by said clock means indicates said set prescribed time, and said prescribed time is included in data transmitted from said computer.

11. The terminal according to claim 10, wherein said communication means performs radio communication.

12. The terminal according to claim 10, further comprising comparing means for comparing data transmitted from said device with a prescribed value, wherein said communication means transmits said start signal to said computer regardless of said prescribed time when said comparing means determines that said transmitted data is not within a range of said prescribed value.

13. The terminal according to claim 10, further comprising redialing means for transmitting said start signal after a prescribed time period has passed when transmission and reception of data to and from said computer cannot be started even if said start signal is transmitted by said communication means.

14. The terminal according to claim 13, wherein said redialing means changes said prescribed time period based on the number of times said start signal is transmitted.

15. The terminal according to claim 13, wherein said redialing means changes said prescribed time period based on a present time.

16. A computer transmitting and receiving data to and from a plurality of terminals connected to devices respectively to diagnose said devices, comprising:

communication means for transmitting and receiving data to and from said terminals;

clock means for measuring time;

means for setting a first time and a second time;

first communication starting means for transmitting to said terminals a start signal for initiating transmission of data between said terminals and said communication means when the measurement of said clock means indicates said first time;

second communication starting means for enabling said communication means when said second communication means receives from said terminals a start signal for starting transmission and reception of data; and time transmitting means for transmitting said second time to said terminals when said communication means is enabled by said second communication starting means.

17. The computer according to claim 16, wherein said communication means includes radio communication.

18. The computer according to claim 16, further comprising redialing means for transmitting said start signal after a prescribed time period has passed when transmission and reception of data to and from said terminals cannot be started even if said start signal is transmitted by said first communication starting means.

* * * * *